United States Patent
Kunz et al.

(10) Patent No.: US 8,097,385 B2
(45) Date of Patent: Jan. 17, 2012

(54) BIPOLAR PLATE FOR FUEL CELL

(75) Inventors: H. Russell Kunz, Vernon, CT (US);
Leonard Bonville, Marlborough, CT (US); Rachid Zaffou, East Hartford, CT (US); Ruichun Jiang, Rochester, NY (US); James Fenton, Cocoa, FL (US)

(73) Assignee: University of Connecticut, Farmington, CT (US)

( * ) Notice: Subject to any disclaimer, the term of this patent is extended or adjusted under 35 U.S.C. 154(b) by 1253 days.

(21) Appl. No.: 11/811,762

(22) Filed: Jun. 12, 2007

(65) Prior Publication Data
US 2008/0090129 A1    Apr. 17, 2008

Related U.S. Application Data

(60) Provisional application No. 60/812,871, filed on Jun. 12, 2006.

(51) Int. Cl.
*H01M 2/16* (2006.01)
*H01M 2/22* (2006.01)
*H01M 4/80* (2006.01)

(52) U.S. Cl. ......... 429/521; 429/457; 429/463; 429/514

(58) Field of Classification Search .................. 429/457, 429/463, 514, 518, 521
See application file for complete search history.

(56) References Cited

U.S. PATENT DOCUMENTS

| | | | |
|---|---|---|---|
| 6,465,136 B1 | 10/2002 | Fenton et al. | |
| 6,638,659 B1 | 10/2003 | Fenton et al. | |
| 2006/0008695 A1* | 1/2006 | Bai et al. | 429/38 |
| 2006/0088756 A1* | 4/2006 | Sato et al. | 429/38 |
| 2006/0280994 A1* | 12/2006 | Kim et al. | 429/38 |

* cited by examiner

*Primary Examiner* — Tracy Dove
(74) *Attorney, Agent, or Firm* — McCarter & English, LLP

(57) ABSTRACT

The present disclosure provides for a bipolar plate assembly for use in a fuel cell stack. The bipolar plate assembly includes: (a) at least one flow field layer defining a flow field portion and a perimeter portion; (b) at least one core assembly including at least one porous carbon layer and at least one impermeable layer; and (c) a cathode side reactant and an anode side reactant. The at least a first flow field layer is made from a porous carbon material and the perimeter portion is impregnated with a polymer material. The porous carbon layer is joined to: (i) the at least one impermeable layer on a first side by an adhesive material; and (ii) the flow field layer perimeter on a second side by a second adhesive material. The at least a first flow field layer defines reactant inlet and outlet ports and reactant flow passageways for each of the cathode side reactant and the anode side reactant. A method of making such a bipolar plate as described herein is also provided, as well as a method for rendering a layer of carbon material substantially impervious to a liquid agent such as an acid and rendering the porous carbon components wettable to retain an acidic liquid electrolyte. Fuel cell bipolar plates made in accordance with the teachings herein exhibit excellent heat transfer characteristics, and are particularly effective in conducting heat to the edge of a fuel cell stack.

25 Claims, 19 Drawing Sheets

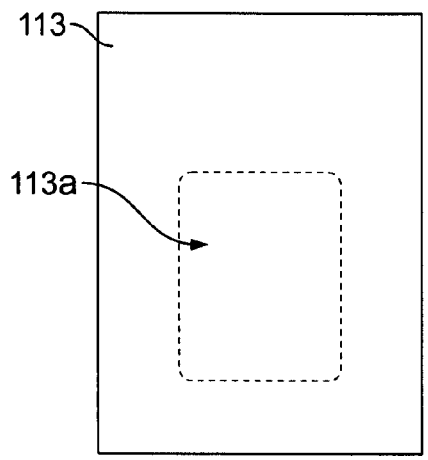
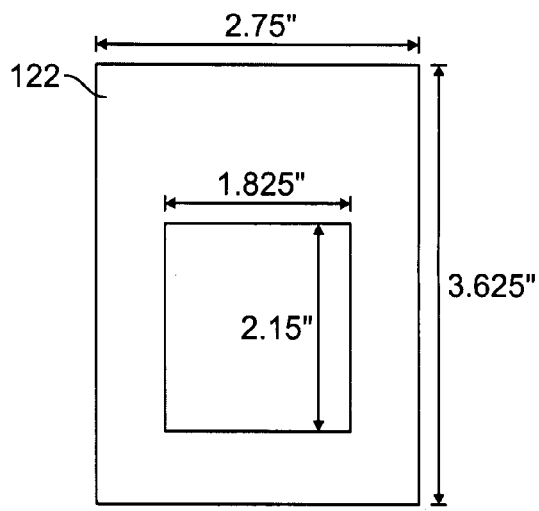
FIG. 4          FIG. 6
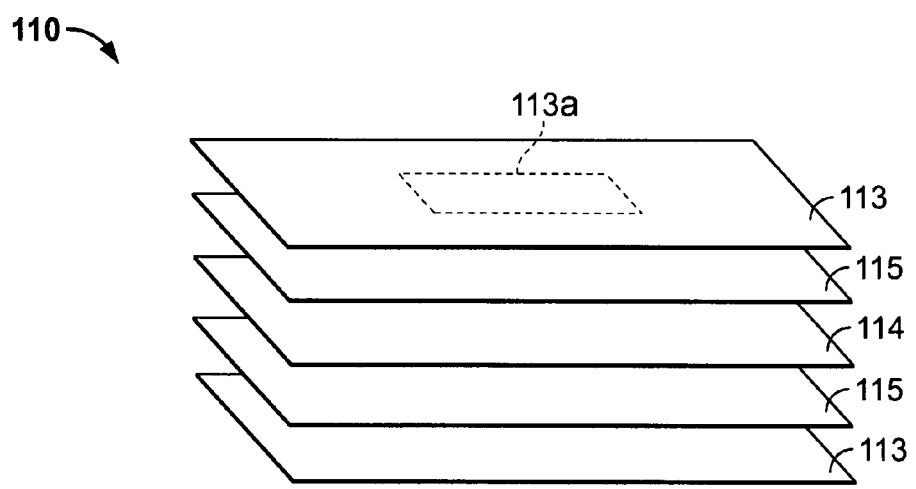
FIG. 5

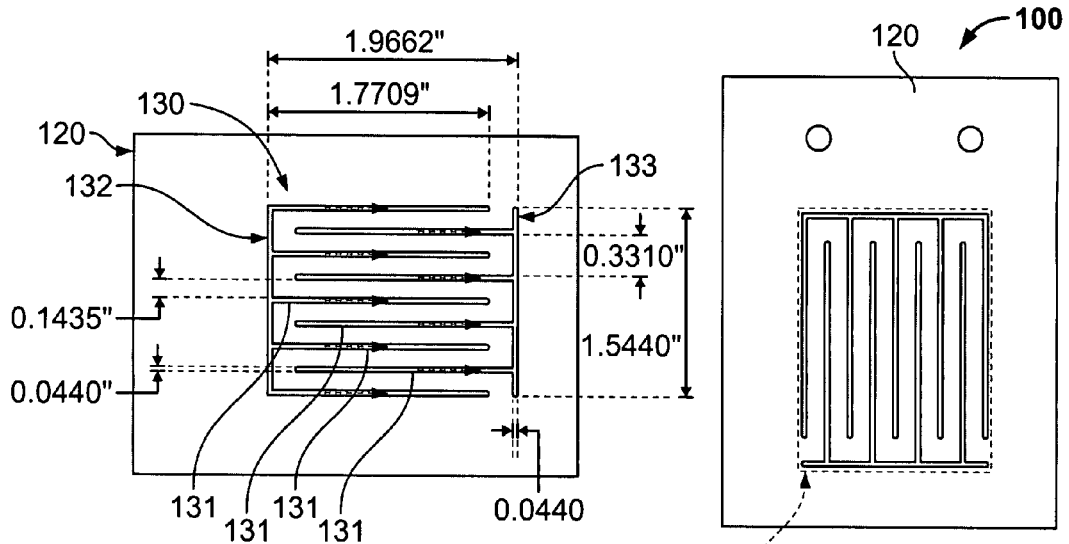
FIG.7
FIG. 8
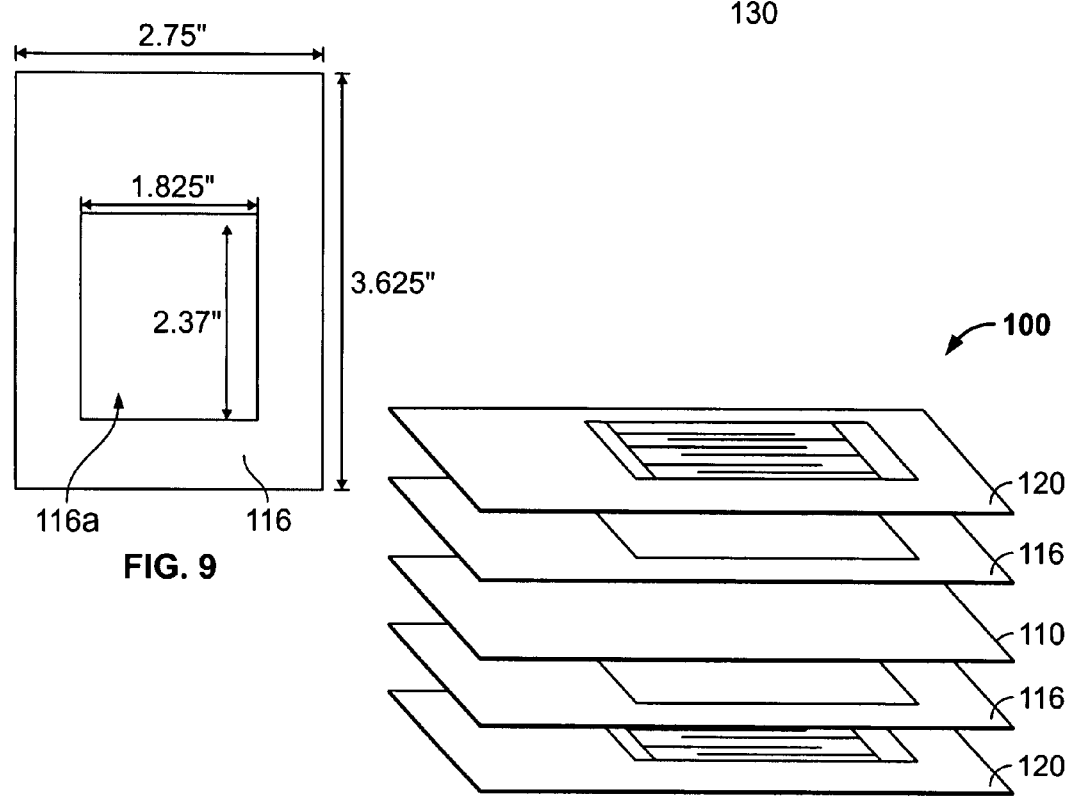
FIG. 9
FIG. 10

Cell Width = 6 cm
Fin Length = 0.52 cm
Current Density = 200 mA/sq cm
Convective Heat Transfer Coefficient = 5.7e-3 Watts/sq cm K
Coolant Temperature = 25 K
All Heat is Removed by Fins.
One Fin/Cell
Measured Plate k = 1.0 Watt/cm K
Published Graphoil Fin k = 1.4 Watt/cm K

BIPOLAR PLATE FOR FUEL CELL

CROSS-REFERENCE TO RELATED APPLICATIONS

The present application claims the benefit under 35 U.S.C. § 119(e) of U.S. Provisional Application No. 60/812,871, filed Jun. 12, 2006. The foregoing application is also hereby incorporated by reference in its entirety for all purposes.

BACKGROUND

1. Technical Field

The present disclosure relates to a bipolar plate for an electrochemical fuel cell. Particularly, the present disclosure is directed to a bipolar plate for a fuel cell made from low cost materials, such as carbon materials.

2. Background Art

Portable fuel cells must meet strict cost requirements in order to be commercially viable. One of the components that contributes a major cost to such cells is the bipolar plate that separates the individual cells.

Bipolar plates serve a number of functions in a fuel cell and have certain requirements. Bipolar plates facilitate the distribution of fuel gas and air uniformly over the active area of the membrane electrode assembly ("MEA"). Ideally, bipolar plates should be gas impermeable and have a suitable flow field design for operation. Bipolar plates conduct electric current from cell to cell and/or to an external load. As such, bipolar plates should have low bulk electrical resistance and low contact resistance. Bipolar plates may also facilitate heat removal from the active area of the fuel cell helping to maintain proper operation temperature and therefore require good thermal conductivity. Bipolar plates should prevent leakage of gases and coolant and be resistant to chemical corrosion. Moreover, bipolar plates should have good mechanical properties including suitable flexural strength as well as a suitable thermal expansion coefficient. Bipolar plates should also have low weight, low volume and low cost.

To get useful work out of fuel cells in the form of a useful voltage, a plurality of fuel cells are generally connected in series. The anode of one cell is connected to the cathode of the adjacent cell via the bipolar plate. The bipolar plate performs the dual functions of gas supply to the active areas of the cell and electron conduction from the anode of one cell to the cathode of the adjacent cell or to the load. Moreover, bipolar plates have many other application specific requirements.

Certain types of fuel cells utilize a polymer electrolyte membrane. These fuel cells can be useful in portable applications. U.S. Pat. No. 6,465,136 and U.S. Pat. No. 6,638,659 are generally directed to high temperature MEAs for use with these types of fuel cells. The disclosure of each of these patents is explicitly incorporated by reference herein in its entirety. Some of these polymer electrolyte membranes incorporate phosphoric acid electrolyte.

Due to the highly acidic environment and the high temperature of operation in such applications, the bipolar plates must be corrosion resistant. Such bipolar plates, especially for portable fuel cells, should be lightweight and also have a high thermal conductivity for heat dissipation. Moreover, the bipolar plate represents a significant portion of the overall stack cost. Therefore, reducing the material and the fabrication cost of the bipolar plate is also important. Thus, there remains a continued need in the art for a fuel cell having bipolar plates that address the above issues. The present disclosure provides a solution for these problems.

These and other disadvantages and/or limitations are addressed and/or overcome by the systems and methods of the present disclosure.

SUMMARY

The purpose and advantages of the present disclosure will be set forth in and apparent from the description that follows. Additional advantages of the disclosure will be realized and attained by the devices, methods and systems particularly pointed out in the written description and claims hereof, as well as from the appended drawings.

To achieve these and other advantages and in accordance with the purpose of the disclosure, as embodied herein and broadly described, the disclosure includes a fuel cell having a novel bipolar plate made from a low cost material including carbon that is designed in a way to meet all of the functional requirements of a fuel cell, such as a small portable fuel cell that operates on reformed methanol and air.

While particular embodiments of bipolar plates made in accordance with the present disclosure in the accompanying description are used in combination with a fuel cell having an acidic electrolyte, it will be recognized that the disclosure is not so limited. As will be appreciated by one of skill in the art, bipolar plates made in accordance with the teachings herein can be employed in many different types of fuel cells, including polymer electrolyte membrane (PEM) and direct methanol fuel cells (DMFC).

It is to be understood that both the foregoing general description and the following detailed description are exemplary and are intended to provide further explanation of the disclosure claimed. The accompanying drawings, which are incorporated in and constitute part of this specification, are included to illustrate and provide a further understanding of the method and system of the disclosure. Together with the description, the drawings serve to explain the principles of the disclosure.

The present disclosure provides for a bipolar plate assembly for use in a fuel cell stack, including: (a) at least one flow field layer defining a flow field portion and a perimeter portion; (b) at least one core assembly including at least one porous carbon layer and at least one impermeable layer; and (c) a cathode side reactant and an anode side reactant. The at least one flow field layer is made from a porous carbon material and the perimeter portion is impregnated with a polymer material. The porous carbon layer is joined to: (i) the at least one impermeable layer on a first side by an adhesive material; and (ii) the flow field layer perimeter on a second side by a second adhesive material. The at least one flow field layer defines reactant inlet and outlet ports and reactant flow passageways for each of the cathode side reactant and the anode side reactant.

Typically, the cathode side reactant is air and the anode side reactant is fuel. The fuel can be selected from the group consisting of hydrogen and a hydrogen carrying gas. In an exemplary embodiment the impermeable layer is made from carbon and exhibits electrical and heat conductive properties. In a further exemplary embodiment, the bipolar plate assembly includes a second flow field layer disposed on an opposite side of the core assembly with respect to the at least a first flow field layer. The adhesive material can be a fluorocarbon, and the adhesive infiltrates pores defined in the porous carbon material associated with the flow field layer and the porous carbon layer. The porous carbon layer associated with the core assembly can be impregnated with a polymer material defining a porous portion adapted to allow for fluid interaction through both the flow field portion of the flow field layer and the porous portion of the porous carbon layer. The first and second adhesive materials are layers defining openings adapted to allow for fluid interaction between the porous portion of the porous carbon layer and the flow field portion of the flow field layer. In an exemplary embodiment, the adhesive material is selected from the group consisting of Polytetrafluoroethylene (PTFE), Perfluoroalkoxy (PFA) and Fluorinated Ethylene Propylene (FEP).

In an exemplary embodiment, the at least one flow field layer defines a plurality of parallel flow passageways and the inlet and outlet ports manifold to allow the reactants to pass through the flow passageways. In a further exemplary embodiment, the flow passageways define a substantially serpentine geometry and the inlet and outlet ports manifold to allow the reactants to pass through the flow passageways. The bipolar plate is generally defined by a generally rectangular perimeter. In an exemplary embodiment, the impermeable layer includes at least one cooling fin extending beyond the generally rectangular perimeter. The cooling fin can be integrally formed with respect to the impermeable layer. The flow field layer, the porous carbon material and the impermeable layer define through plane electrical conductivity and the through plane electrical conductivity is not substantially compromised by the adhesive material. The at least one flow field layer made from a porous carbon material can be selected from the group consisting of sealed carbon paper, carbon/polymer composites, and carbon mat. The at least one porous carbon layer can be made from a porous carbon material selected from the group consisting of sealed carbon paper, carbon/polymer composites, and carbon mat.

The present disclosure provides for an exemplary fuel cell stack assembly including: (a) a plurality of bipolar plates, at least one of the bipolar plates including a plurality of adjacent layers of material joined by an adhesive material, wherein at least one of the layers is composed of carbon material; and (b) at least one membrane-electrode assembly disposed between two of the bipolar plates. In an exemplary embodiment, each of the bipolar plates further includes: (a) at least one flow field layer defining a flow field portion and a perimeter portion; (b) at least one core assembly including at least one porous carbon layer and at least one impermeable layer; (c) a cathode plate and an anode plate; and (d) a cathode side reactant and an anode side reactant.

In an exemplary embodiment, the at least one flow field layer is made from a porous carbon material and the perimeter portion is impregnated with a polymer material The porous carbon layer is joined to: (i) the at least one impermeable layer on a first side by an adhesive material; and (ii) the flow field layer perimeter on a second side by a second adhesive material. The plurality of bipolar plates are disposed between the cathode and the anode plates. The at least one flow field layer defines reactant inlet and outlet ports and reactant flow passageways for each of the cathode side reactant and the anode side reactant. Typically the cathode side reactant is air and the anode side reactant is fuel. The fuel can be selected from the group consisting of hydrogen and a hydrogen carrying gas.

The present disclosure provides for an exemplary method of manufacturing a bipolar plate for a fuel cell comprising the steps of: (a) providing at least one flow field layer made from porous carbon material; (b) impregnating the porous carbon material with a sealing polymer material yielding a composite flow field layer defining a porous flow field portion surrounded by a composite perimeter portion; (c) providing a core assembly including a porous carbon material and an impermeable layer, the porous carbon material defining a porous portion and a perimeter portion impregnated with a polymer material yielding a composite porous layer; (d) joining the impermeable layer to the composite porous layer by disposing an adhesive material about the perimeter portion associated with composite porous layer and applying pressure and heat sufficient to cause the adhesive material to flow and join the layers of carbon material; and (e) joining the composite flow field layer to the composite porous layer by disposing an adhesive material about the perimeter portions associated with each layer and applying pressure and heat sufficient to cause the adhesive material to flow and join the layers of carbon material.

In an exemplary embodiment, the carbon material is selected from the group consisting of sealed carbon paper, carbon/polymer composites, and carbon mat. The adhesive material can include a fluorocarbon material. The adhesive material can be applied in the form of a paste or in the form of a sheet. The adhesive material can be selected from the group consisting of Polytetrafluoroethylene (PTFE), Perfluoroalkoxy (PFA) and Fluorinated Ethylene Propylene (FEP). The carbon components can be treated to increase wettability of the carbon components. The porous carbon material defines a plurality of pores and the carbon components can be treated to increase wettability by coating the pores of the porous carbon material with a wettable material. The wettable material can be carbon black. The impermeable layer can be treated such that the impermeable layer is rendered substantially impervious to infiltration by an acidic liquid. In an exemplary embodiment the method further includes the steps of adding liquid phosphoric acid electrolyte to the bipolar plate to provide a reservoir of electrolyte during cell operation following cell assembly.

Additional features, functions and benefits of the disclosed systems and methods will be apparent from the description which follows, particularly when read in conjunction with the appended figures.

BRIEF DESCRIPTION OF THE DRAWINGS

FIG. 4 depicts a portion of the exemplary bipolar plate with respect to FIG. 1;

FIG. 5 depicts a portion of the exemplary bipolar plate with respect to FIG. 1;

FIGS. 6-8 depicts a portion of the exemplary bipolar plate with respect to FIG. 1;

FIG. 9 depicts a portion of the exemplary bipolar plate with respect to FIG. 1;

FIG. 10 depicts a further exploded view of the exemplary bipolar plate with respect to FIG. 1;

DESCRIPTION OF EXEMPLARY
EMBODIMENT(S)

The present disclosure relates to exemplary systems and methods for bipolar plates related to fuel cell technologies and applications. Exemplary embodiments are illustrated in the accompanying drawings.

In an exemplary embodiment, the systems and methods presented herein may be used as bipolar plates for a variety of different fuel cells. Devices made in accordance with the teachings of the present disclosure are particularly well suited for low cost, high volume applications such as for portable fuel cells. A particular advantage associated with bipolar plates made in accordance with the present disclosure includes but is not limited to relatively lower cost compared to other alternatives presently being used. Bipolar plates known in the art can be metallic (e.g., aluminum) with gold plating for corrosion resistance. The cost of gold plating increases the cost of the metallic bipolar plate. In certain applications, over time, the gold tends to flake off from the metal leading to a surface prone to attack by acid (e.g., phosphoric acid) associated with an electrolyte.

Figure 1:
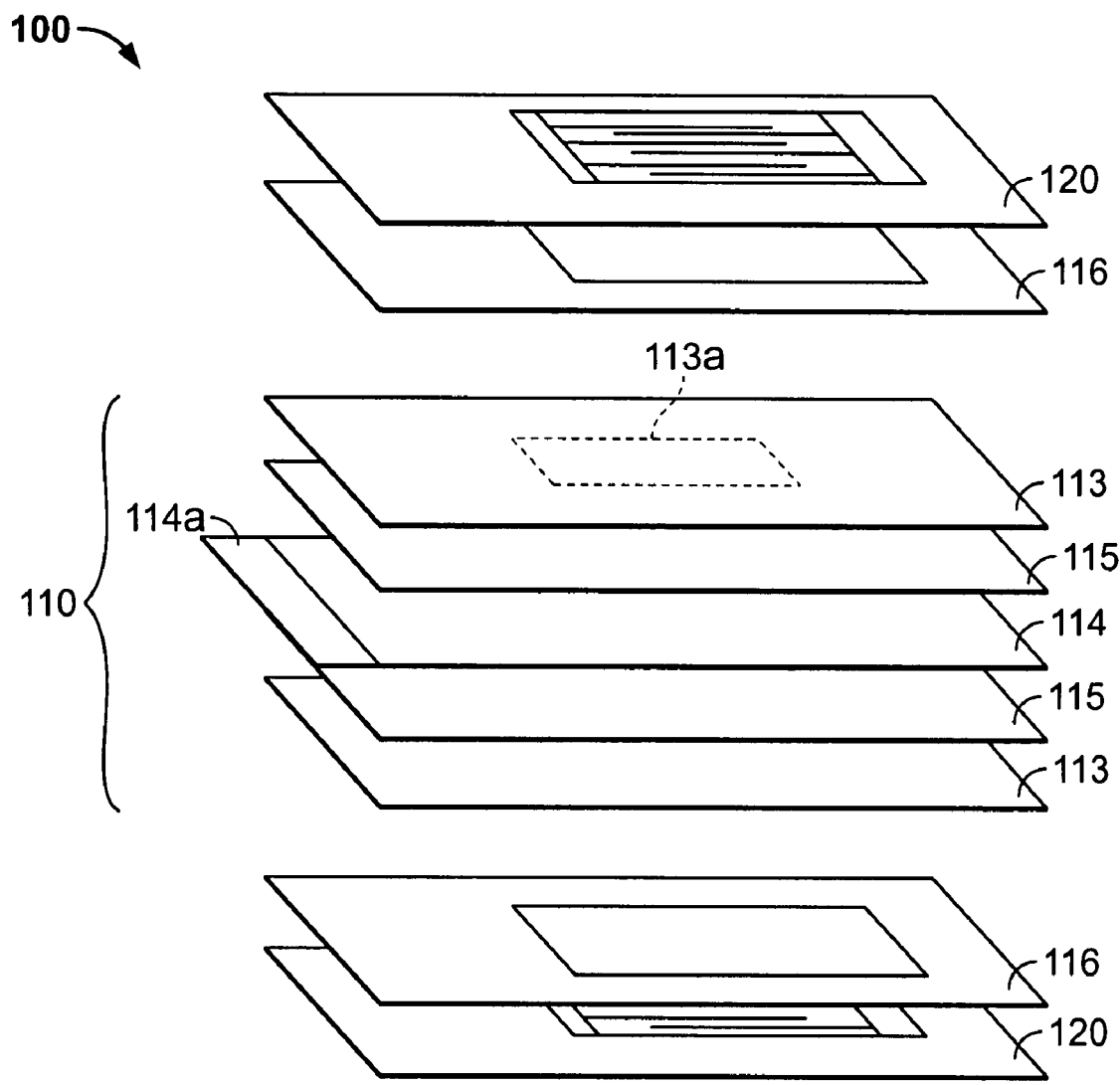
FIG. 1 is an exploded view of an exemplary bipolar plate according to the present disclosure.
Figure 2:
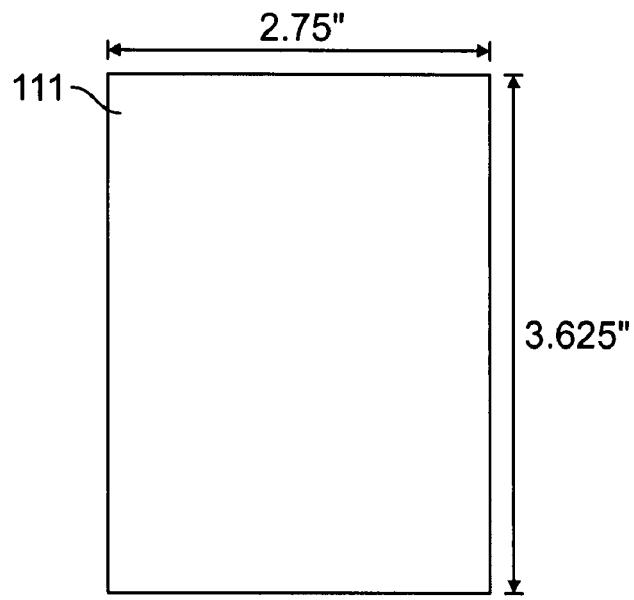
FIG. 2 depicts a portion of the exemplary bipolar plate with respect to FIG. 1.
Figure 3:
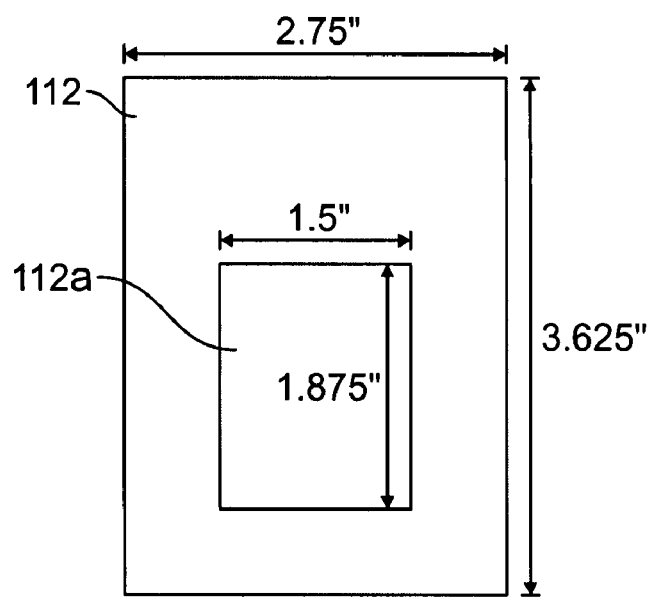
FIG. 3 depicts a portion of the exemplary bipolar plate with respect to FIG. 1.

In an exemplary embodiment, base materials in bipolar plates made in accordance with the present disclosure include at least carbon, which is relatively inexpensive, acid resistant, light in weight, and has suitable thermal and electrical conductivity. FIG. 1 illustrates a partial and exploded view of an exemplary bipolar plate 100 made in accordance with the present disclosure. With reference to FIGS. 1-3, an exemplary bipolar plate assembly 100 is shown made in accordance with the present disclosure. In an exemplary embodiment, assembly 100 includes a core assembly 110 and a flow field layer 120. Each of core assembly 110 and flow field layer 120 can be formed from one or more layers of carbon material. Depending on the specific carbon material used, all or a portion of the layer of carbon material can be impregnated with a polymeric composition, such as a fluoropolymer.

It is understood that a variety of materials can be used as different carbon material layers associated with exemplary embodiments according to the present disclosure. For example, a relatively impervious material, such as Grafoil®, can be used, as well as porous carbon mats, and carbon/polymer composites. An example of a porous carbon mat is Toray™ carbon paper that is electrically conductive and that can be configured to be impermeable to acid in high-temperature fuel cell conditions and otherwise stable in a fuel cell environment.

In an exemplary embodiment, core assembly 110 can be composed of at least a layer of Grafoil® carbon material 114. The Grafoil® layer 114 is relatively stiff and impervious to fluid infiltration. Core assembly 110 also includes a composite structure 113. In an exemplary embodiment, composite structure 113 is formed from a layer of relatively porous Toray™ carbon paper 111 that is impregnated with a "picture frame" shaped layer 112. Layer 112 can be made from fluorinated ethylene propylene (FEP). Notably, layer 112 is referred to herein as a "picture frame" because a central portion of the layer has been cut out or removed, defining a "window" or "opening" 112a.

In accordance with a particular aspect of the present disclosure, a process is provided of impregnating carbon material with a polymer. Specifically, a process is provided of pressing porous carbon paper with a polymeric layer, such as a fluoropolymer. This process is referred to herein as "hot pressing". In an exemplary embodiment, composite structure 113 is formed by placing layers 111 (FIG. 2) and 112 (FIG. 3) in intimate contact with respect to each other, and subjecting them to pressure at an elevated temperature for a predetermined period of time. During the hot press procedure, the polymeric material melts and is absorbed into the highly porous structure of the porous carbon paper. This results in a layer of carbon paper having FEP impregnated at least about it's perimeter. The FEP impregnation is naturally coextensive with the original extent of FEP picture frame 112. Since the FEP picture frame defines a window 112a, a non-impregnated portion 113a is defined unimpregnated by resin with respect to composite structure 113 (FIG. 4). Portion 113a remains as a highly porous carbon structure, while at least a perimeter portion of composite structure 113 is substantially sealed and maybe impervious to leakage.

In an exemplary embodiment, core assembly 110 is constructed by adhering two FEP filled Toray composite structures 113 and Grafoil layer 114 with respect to one another by way of an adhesive layer 115 such as FEP layers 115 in a hot press process. Layers 113, 115, 114, 115 and 113 are stacked as depicted in FIG. 5 and hot pressed until layers 115 melt and bond with the FEP present in the two 113 structures as well as adhere to Grafoil layer 114, which is pure carbon and non-porous. Thus, in accordance with an exemplary embodiment associated with the present disclosure, composite structures 113 are hot pressed in at least a step of the process in advance of hot pressing all components of core assembly 110.

FIG. 10 illustrates an exemplary exploded view of an exemplary bipolar plate assembly 100 illustrating core 110 as a single assembled plate. Flow field 120 defining a flow field portion 130 as described with respect to FIGS. 7 and 8 is bonded to core 110 through an adhesive layer 116, also referred to as a picture frame adhesive 116 or FEP layer 116. Bonding flow field lawyer 120 with respect to 110 via adhesive 116 is similar to the process used for boding layers 113, 114, and 115 as described with respect to FIG. 5. In an exemplary embodiment, FEP layer 116 defines dimensions as illustrated with respect to FIG. 9 and is adapted to appropriately match the porous or flow field portion associated with layer 120 as described below. The layers of carbon material (Grafoil, Toray and the like) can be provided in varying thicknesses, such as 0.1 to 10 mm. In an exemplary embodiment, each non-polymeric layer of bipolar plate 100 is made from carbon material.

In accordance with an exemplary embodiment associated with the present disclosure, it is appreciated that one or more layers of bipolar plate 100 may be provided in a form non-carbon material, so long as the material provides sufficient through plane conductivity and are otherwise suitable for a particular application. Examples of such materials include, but are not limited to, oxides, carbides and nitrides. It is further appreciated that materials in areas of the cell proximate active portions of membrane electrode assembly 200 (FIG. 38; described below) should have good conductivity. It is further appreciated that portions of bipolar plate that are not in the active area of the cell do not necessarily need to have good conductivity, so long as the conductivity of bipolar plate 100 is sufficient to conduct electricity there through to form a fuel cell stack. Thus, portions of plate 100 for which good conductivity is not essential can be made from materials selected on the basis of cost as well as thermal and acid compatibility, such as polyimide.

In an exemplary embodiment, core assembly 110 can be formed from any suitable number of layers of material. Since in an exemplary embodiment, each structural layer of plate 100 includes material such as a carbon sheet, in-plane thermal conductivity of plate 100 is typically very high. As such, each carbon containing layer can provide an efficient means for conducting excess heat away from the cell. In accordance with a particular exemplary embodiment, Grafoil layer 114 can extend out beyond other portions of bipolar plate 100 to form a cooling fin portion 114a. When a fuel cell stack is assembled including a plurality of plates, fin portions 114a protrude outside a perimeter defined by the other portions of the fuel cell (e.g., layer 113) and are exposed to the external environment. Heat conducted to fins 114a can be transported away from the fuel cell by way of natural and/or forced convection of an air flow, or can be cooled by a liquid, by way of a mixture of conduction and convection mechanisms, if desired. It is appreciated that in an exemplary embodiment, core assembly 110 and the other portions of bipolar plate 100 can be formed defining any suitable exemplary shape (e.g., round, ovoid, hexagonal, and the like).

As further depicted in FIG. 1, bipolar plate 100 further includes a flow field layer 120. In an exemplary embodiment, flow field layer 120 is formed from a piece of Toray paper that is impregnated about its perimeter with polymeric material in a similar way as composite structure 113 except the polymeric material has dimensions defined by layer 122 as illustrated with respect to FIG. 6. However, flow field layer 120 can be further processed to create an interdigitated flow field 130 defining a plurality of flow channels 131 (see e.g., FIGS. 7 and 8). Exemplary dimensions associated with an exemplary flow field 130 are illustrated with respect to FIG. 7. Particular channels carry inlet gas and form an inlet manifold 132. Channels carrying outlet gas form an exit manifold 133.

Figure 32:
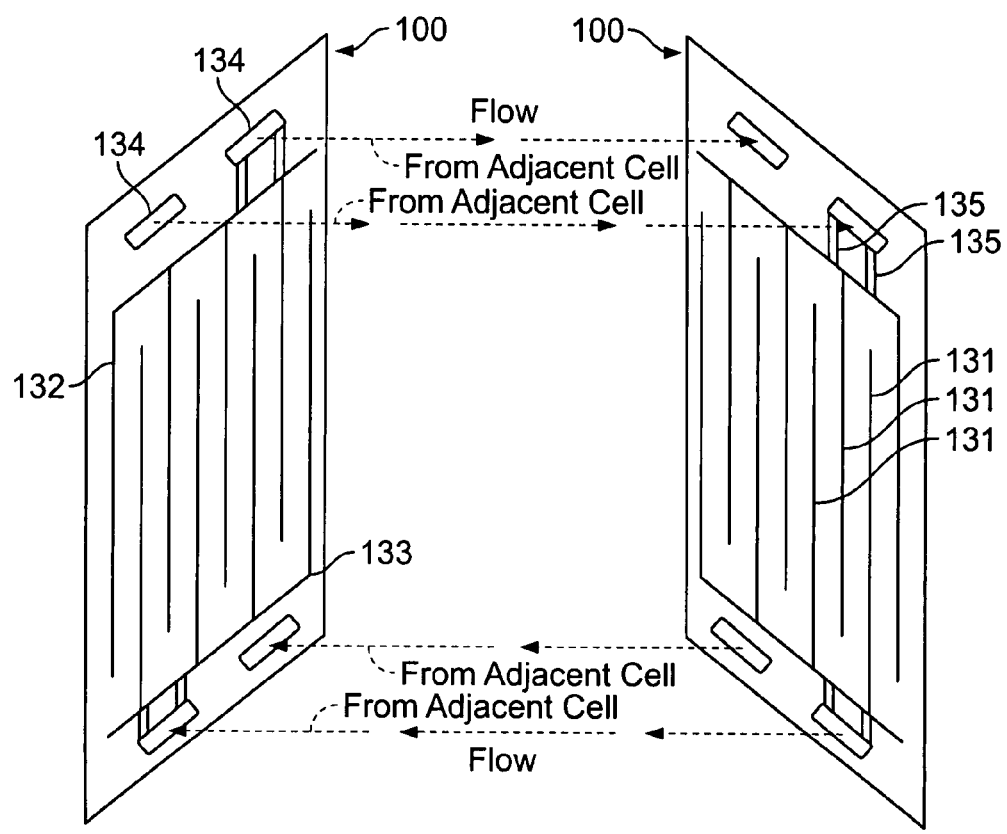
FIG. 32 schematically illustrates how flow passes between successive fuel cells in an exemplary fuel cell stack made in accordance with the present disclosure.

When assembled into an exemplary fuel cell, as depicted in FIG. 32, flow (indicated by arrows) is forced from a channel, associated with inlet manifold 132, through a gas distribution layer 202 (described below with respect to FIG. 38) in a membrane electrode assembly 200 (FIG. 38) into downstream flow channels associated with exit manifold 133. This flow pattern is also depicted by arrows drawn over the flow channels as depicted in FIG. 7. This type of flow forces reactants near the catalyst of the membrane, facilitating reaction in the membrane electrode assembly 200. It has been discovered that in an exemplary embodiment, the majority of the flow passes through the gas distribution layer rather than through the porous carbon wall portion of flow field layer 120 separating adjacent channels 131 associated with inlet manifold 132 and exit manifold 133. This may be a result of less flow resistance presented by the gas distribution layer than by the flow field layer itself.

Figure 11:
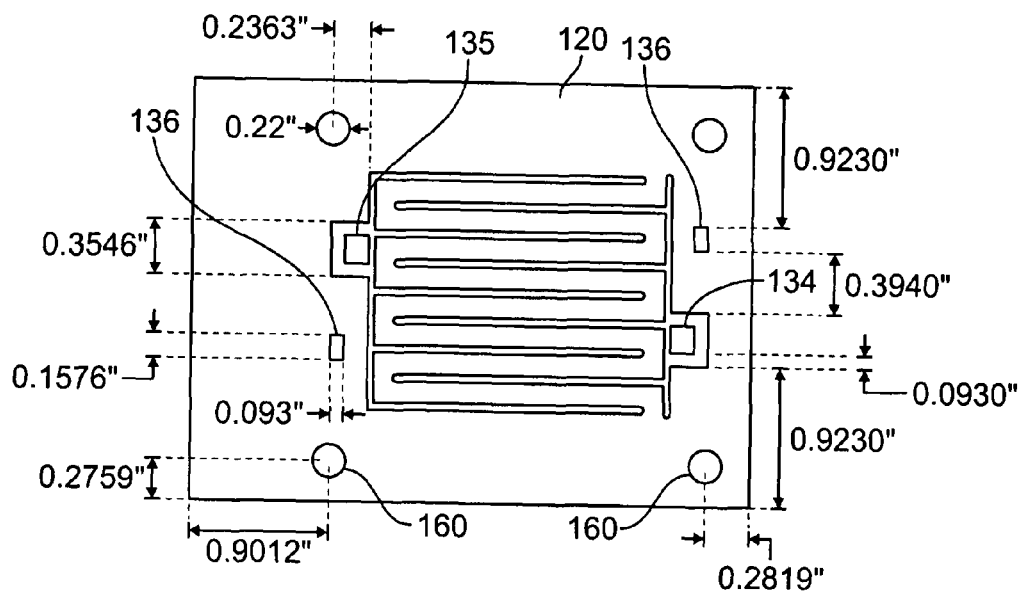
FIG. 11 depicts the exemplary bipolar plate with respect to FIG. 1 illustrating a flow field layer.
Figure 12:
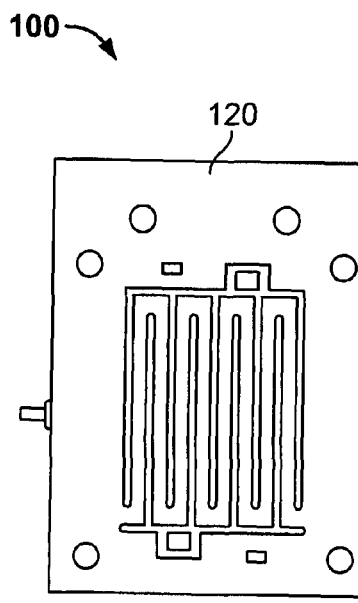
FIG. 12 depicts a top side view of the exemplary bipolar plate with respect to FIG. 1.
Figure 14:
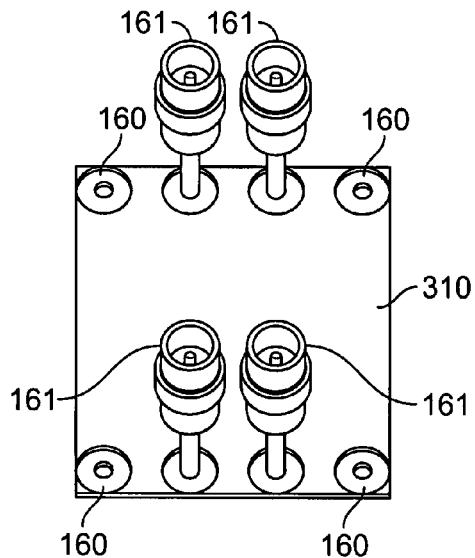
FIGS. 14-15 depict endplates for an exemplary fuel cell made in accordance with the present disclosure.

In an exemplary embodiment, inlet and exit reactant gases are supplied to flow channels 131 through inlet ports 134 situated near the periphery of flow field 130 as illustrated with respect to FIG. 11. The reactants flow through the flow field 130 and then through outlet port 135. Hydrogen passes from cell to cell through hydrogen flow channels 136. A top side view of an exemplary assembly 100 is shown in FIG. 12 illustrating an exemplary flow field layer 120. FIG. 14 illustrates an exemplary anode or cathode plate 310 associated with exemplary assembly 1000 illustrated with respect to FIG. 20. Plate 310 includes couplings 161 that define flow passages for either hydrogen flow and/or reactant flow through the stack. Each coupling 161 is coupled to either of flow channels 134, 135 or 136. Exemplary dimensions are illustrated with respect to an exemplary flow field layer 120 in FIG. 11. In an exemplary embodiment, exemplary flow field layer 120 further defines a plurality of assembly apertures 160 (also referred to as "holes" in other exemplary embodiments) to allow for assembly of the fuel cell stack.

Figure 31:
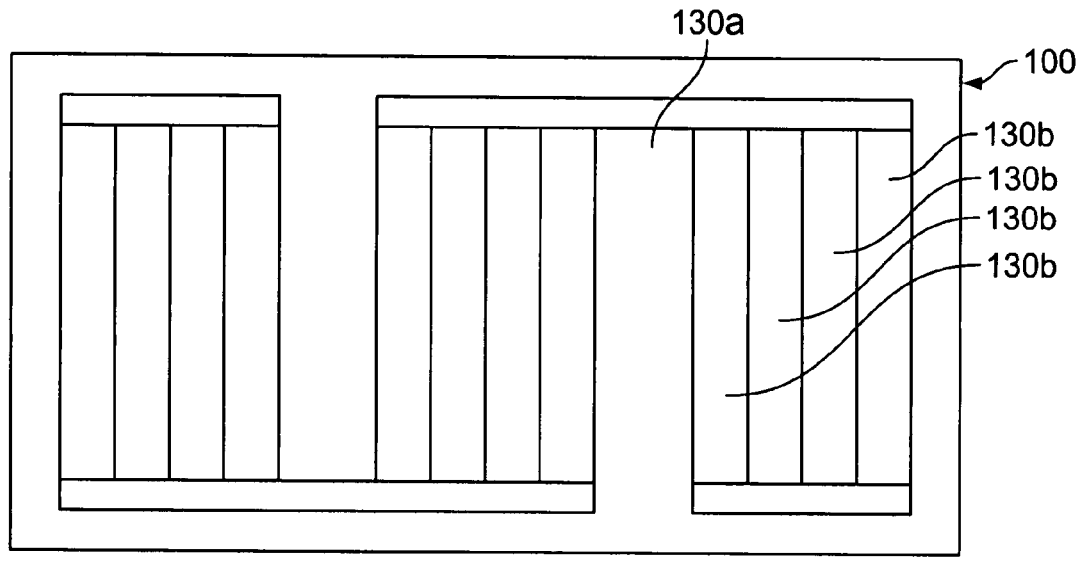
FIG. 31 depicts an exemplary bipolar plate illustrating an alternative serpentine flow field made in accordance with the present disclosure.

The pattern of the flow channels associated with manifold 132 can be varied as desired. For example, as depicted in FIG. 31, a serpentine flow field 130a can be defined such that the flow field allows for transporting working fluid through a plurality of parallel serpentine paths 130b across plate 100. In an embodiment using a serpentine flow path, the flow is not forced through the gas distribution layer as positively as with the interdigitated flow field. Instead, reactants reach the membrane electrode assembly primarily by way of diffusion. It is appreciated that any suitable flow field can be made in flow field layer 120, as is known in the art.

Figure 16:
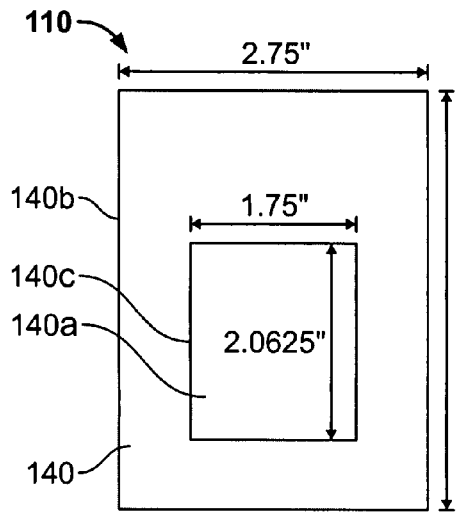
FIGS. 16-17 depict exemplary picture frames used for the assembly of an MEA sandwich in accordance with the present disclosure.
Figure 38:
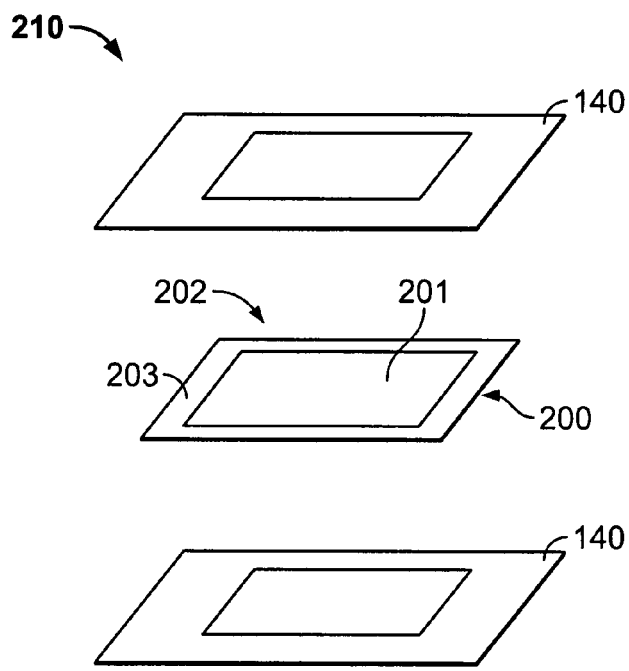
FIG. 38 schematically depicts an exemplary MEA assembly according to the present disclosure.

In accordance with a particular aspect of the present disclosure, carbon picture frames can also be provided to encase a membrane electrode assembly to facilitate assembly of an exemplary fuel cell. As depicted in FIG. 16, exemplary picture frame portion 140 is formed from Toray paper that has been impregnated by a fluorocarbon such as FEP, for example. With reference to an exemplary exploded view of an exemplary embodiment as shown in FIG. 38, picture frame portion 140 can then be placed on either side of a membrane electrode assembly 200 during fuel cell assembly. Combination of two picture frame portions 140 and an MEA 200 can be referred to as an MEA sandwich 210.

Picture frames 140 are preferably of a thickness suitable to provide good electrical contact between the flow field layers 120 of adjacent bipolar plates 100 and an active area 202 of the membrane electrode assembly 200. Each picture frame portion 140 may be formed from a single layer of plastic impregnated carbon material, or from a plurality of layers bonded together by way of hot pressing as described hereinabove. Referring again to FIG. 16, picture frame portion 140 is defined by an external perimeter 140b and an internal perimeter 140c defining an porous portion 140a therein.

Porous portion 140a is adapted and configured to align with active portion 202 of membrane electrode assembly 200 (FIG. 38) when bipolar plates 100 are arranged with one or more membrane electrode assemblies to form a fuel cell stack. As shown with respect to FIG. 17, in an exemplary embodiment, picture frame portion 140 can further be provided with reactant inlet ports 134 and defining holes 160 for permitting manifolding and assembly of the fuel cell stack as described herein.

In an exemplary embodiment, the layers of the bipolar plate assembly 100 are bonded together using high temperature adhesive. While Fluorinated Ethylene Propylene (FEP) is mentioned above, it is understood that a variety of materials can be effective for adhesive bonding. For example, additional suitable adhesive materials include, Polytetrafluoroethylene (PTFE) and Perfluoroalkoxy (PFA). These materials are effective candidates for bonding and sealing the layers of the bipolar plate assembly, and are lightweight and stable in a typical high temperature environment of a fuel cell stack, which can also be acidic, depending on the specific type of fuel cell used. The adhesive material can be provided in a form of a prefabricated sheet of material. In an exemplary embodiment, the adhesive can be provided in the form of a low cost paste, such as a paste including fluoropolymeric materials.

As mentioned above, bonding the layers of bipolar plate 100 can be accomplished by hot pressing the layers at high temperature and pressure to allow the adhesive to melt and flow through each layer. In an exemplary embodiment, carbon material is used for each layer to facilitate the flow of adhesive material there through.

Figure 13:
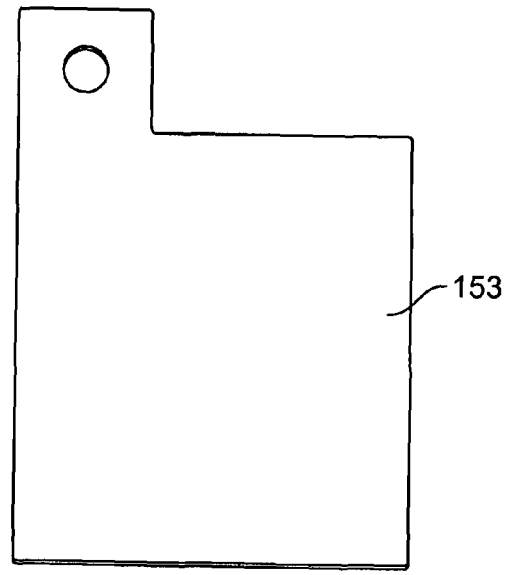
FIG. 13 depicts a current collection tab used to collect current from a fuel cell made using exemplary bipolar plates according to the present disclosure.
Figure 18:
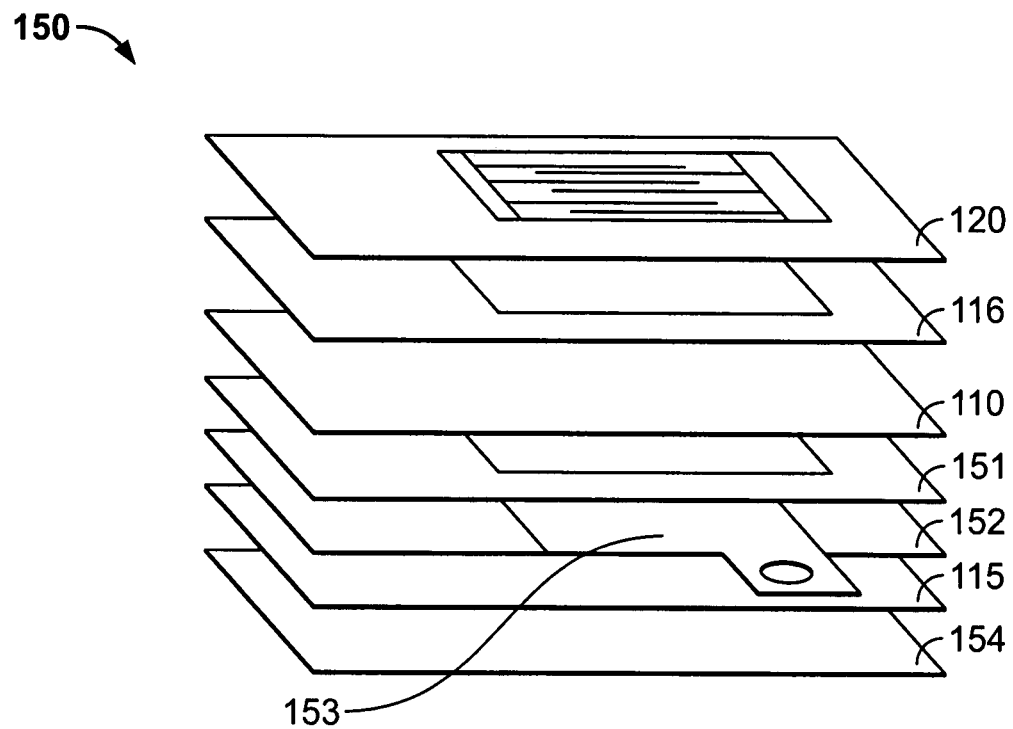
FIG. 18 depicts an exploded view of an exemplary single cell bipolar plate.

In accordance with a further exemplary embodiment of the present disclosure, bipolar plates located at an end of the fuel cell stack, or those used in a single cell assembly, necessarily need to be modified, as described hereafter and depicted with respect to FIG. 18. Single cell bipolar plates 150 are constructed similarly to bipolar plates 110, save bottom layers 116 and 120 are omitted. In their place is a current collection tab, from which current of the stack or cell is drawn. As an example, a stainless steel plate 153 can be used. In an exemplary embodiment, stainless steel plate 153 depicted by FIG. 13 is of similar size as the flow field 130 (FIGS. 7 and 8), with a tab extending beyond the edge, to which current collector cables can be attached. To bond stainless steel plate 153 to core assembly 110, and to provide structural support, a frame 152 is placed substantially surrounding plate 153. Frame 152 can be of similar thickness to plate 153. Adhesive layer 115 is used to effectuate bonding to layer 154.

By way of example, Graphoil can be used, where a section of the Graphoil is removed to allow plate 153 to be positioned below the flow field area 130 associated with flow field layer 120, and remain in the same plane as the Graphoil frame 152. To increase structural support, a second piece of Graphoil 154, with no sections removed, is placed below frame 152 and plate 153. A piece of 0.001" FEP 151, cut to the dimensions of 112, and a piece of 0.001" FEP 115 are used to bond the plate 153 and frame 152 to core assembly 110.

Bonding of the bipolar plate 100 is accomplished by stacking flow field layer 120 FEP picture frame 116 (FIG. 9) core assembly 110 a second FEP picture frame 116 and a second flow field layer 120, as shown with respect to FIG. 10 and then hot pressing this stack as described with respect to hot pressing techniques discussed below.

Components of the bipolar plate 100 are preferably impervious to the acidic working fluid, since the acid can wick into the carbon structure of the fuel cell and migrate between cells leading to fuel cell failure. Advantageously, use of a high temperature adhesive not only bonds the various layers together but can also be used to seal the pores of the carbon layers of the bipolar plate assembly to prevent leakage of fluids (e.g., acids) through the carbon material. Sealing is important to prevent acid crossover between two adjacent fuel cells in the stack as well as to create a barrier to prevent acid and reactant gas from leaking out of the stack. Thus, a method is provided for pre-treating the carbon material as described herein by sealing the carbon material rendering it substantially impervious to infiltration by a fluid, such as an acidic electrolyte.

The sealing is carried out in a manner very similar to the joining of carbon layers as described herein by hot pressing layers together. Instead of hot pressing multiple layers of carbon together with adhesive, it is possible, for example, to merely heat a single layer of carbon material under pressure with a layer of adhesive. The adhesive or sealant material melts and flows into the pores of the carbon material to render it substantially impervious to fluid infiltration. Examples of this method and the resulting sealed carbon material are used to create components such as composite structure 113 as described above, and is further described and illustrated in the Examples below.

Suitable temperature ranges for hot pressing are dependent on the adhesive material used. For example, a suitable temperature range for hot pressing can be 255-365° C. In accordance with an exemplary embodiment PTFE is used as an adhesive material. In an exemplary embodiment, a suitable hot pressing temperature range for PTFE is about 315-365° C. In a further exemplary embodiment, the temperature range is about 325-345° C. In yet another exemplary embodiment, the temperature is about 312-320° C. In accordance with a further exemplary embodiment, PFA is used as an adhesive material. In an exemplary embodiment, a suitable hot pressing temperature range for PFA is about 305-355° C. In a further exemplary embodiment, the temperature range is about 310-332° C. In yet a further exemplary embodiment, the temperature is about 312-320° C.

In an exemplary embodiment, FEP is used as an adhesive material. In an exemplary embodiment, a suitable hot pressing temperature range for FEP is about 255-295° C. In a further exemplary embodiment, the temperature range is about 265-288° C. In yet further exemplary embodiment, the temperature is about 276-282° C.

Various ranges can also be used for the pressure applied in the hot pressing process. For example, a suitable pressure range for hot pressing is about 10-275 Bar. In a further exemplary embodiment, the pressure range is about 70-210 Bar. In yet a further exemplary embodiment, the pressure is about 125-150 Bar.

The time that pressure is applied to perform the hot press can also be varied. For example, a suitable treatment time for hot pressing is about 1 minute to about 12 hours. In a further exemplary embodiment, the treatment time is about 2 minutes to about 2 hours. In yet a further exemplary embodiment, the treatment time is about 15 minutes to about 30 minutes.

The resulting adhesive laminate structure of the bipolar plate 100 contributes strength and stiffness to the layers of the bipolar plate assembly 100. The hot-press procedure can generally be accomplished without compromising the through-plane electrical and thermal conductivity provided by the carbon material in the bipolar plate assembly.

In an exemplary embodiment, carbon material as described herein can be coated to make it more wettable. In operation, if the surfaces of the flow passages in a fuel cell are not wettable, the working fluid (e.g., phosphoric acid) can bead up and harm fuel cell performance. Thus, it is advantageous for the flow surfaces through which acid flows to be wettable.

In accordance with a particular exemplary embodiment of the present disclosure, wettability is enhanced by permitting the working fluid of the fuel cell to wick into the carbon material that lines the flow passages. This is facilitated by not impregnating the flow surfaces with a polymeric material such as PFA (such as with composite structure 113). Since the material making up the flow passages is porous, the acidic electrolyte (e.g., phosphoric acid) wicks into the porous carbon material, thereby enhancing wettability of the surfaces that contact the working fluid. However, as described above, the perimeters of all components of bipolar plate 100 as well as the exterior surfaces of bipolar plate 100 are rendered impervious to acid wicking by way of polymeric impregnation as described herein, or by use of a carbon material that is substantially impervious to acidic wicking (e.g., Grafoil).

Figure 35:
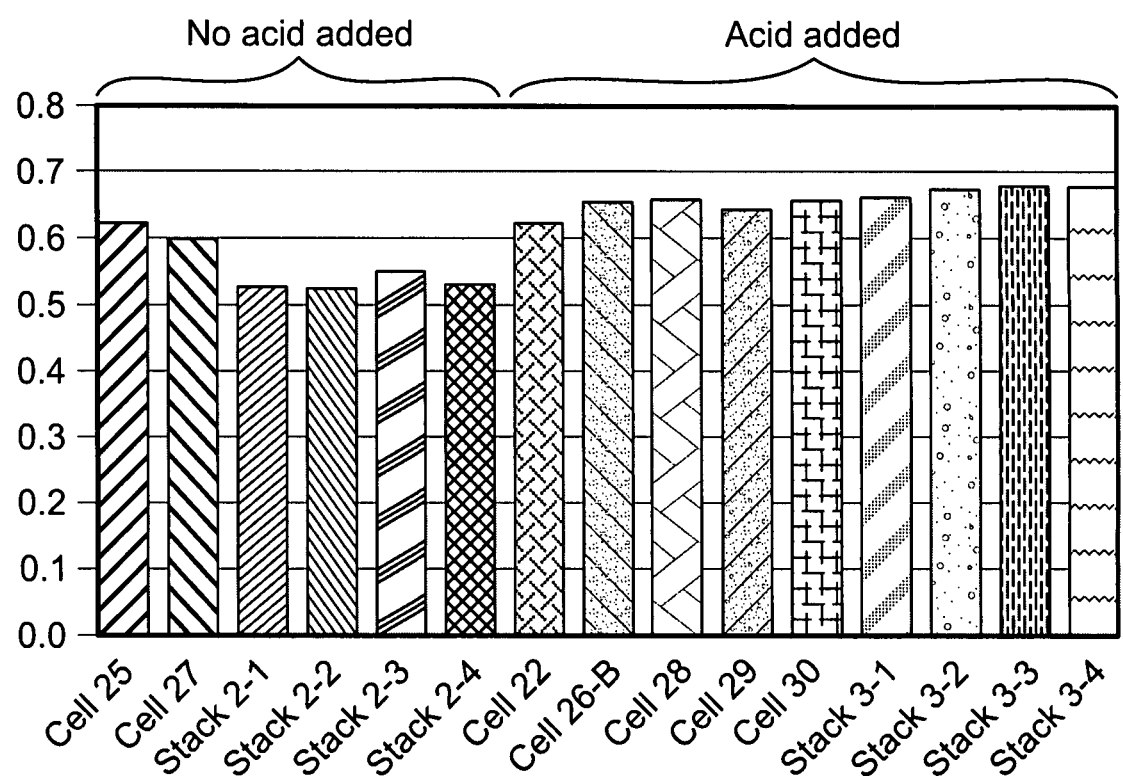
FIG. 35 graphically illustrates improved performance associated with addition of phosphoric acid and using a porous Toray Sheet.

By way of further example, the pores of the carbon surfaces that contact the acidic fluid can be coated with a powdered carbon material to enhance wettability. The carbon material absorbs acid at the surface, which in turn enhances flow surface wettability. Suitable materials include, for example, carbon black materials such as Cabot Vulcan XC-72, commercially available from Cabot Corporation (Two Seaport Lane, Suite 1300, Boston, Mass. 02210-2019). The carbon black material can be applied in a variety of manners, including by way of painting on, screen printing and spraying, among others. Once the carbon surfaces have been painted, phosphoric acid can be added, and allowed to wick into the interior of the carbon. In this manner, performance can be enhanced, as shown in FIG. 35.

In accordance with an exemplary embodiment of the present disclosure, a bipolar plate is disclosed for small portable cell stacks, such as those used as a power source in high-end electronic devices. The specific design of the plate to meet the needs of a small portable cell stack can be similar to that depicted in FIG. 1. The bipolar plate 100 depicted in FIG. 1 can be small in area. In accordance with a particular exemplary embodiment, the area of the plate is about 18 cm$^2$. Research and development activities have been carried out to date to further develop bipolar plates as described herein. A portion of this work is described herein in the following Examples:

Example 1

1. Description of an Exemplary Bipolar Plate Manufacturing Procedure

In accordance with an exemplary embodiment of the present disclosure, manufacturing of a bipolar plate begins by fabricating two main parts, the core assembly 110 and the interdigitated flow field insert layer 120. These parts are then hot-pressed together to make the bipolar plate. The following sections detail the steps involved in the making of the core assembly 110 and the interdigitated flow field insert layer 120, and also the procedure to assemble the bipolar plate 100 as well as a fuel cell.

Figure 19:
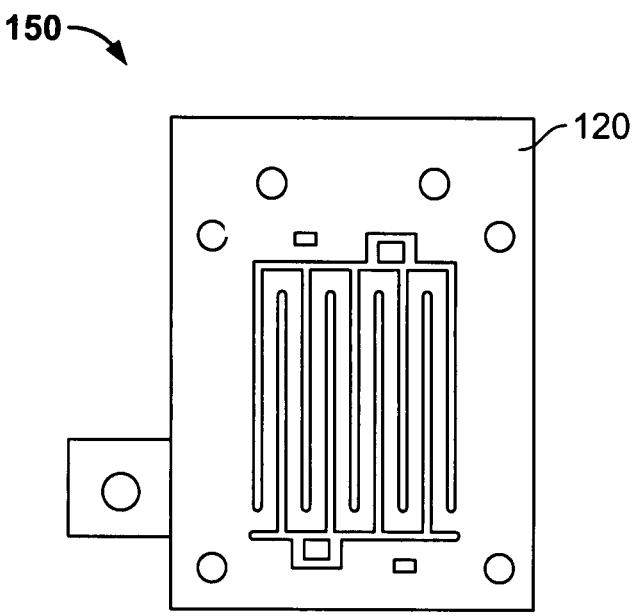
FIG. 19 depicts a top side view of an exemplary single cell bipolar plate.

The present example describes construction of a single cell embodiment. As such, two single cell bipolar plates were constructed, and described hereafter. Since only a single cell was built and tested, each single cell bipolar plate 150 (FIG. 18) includes a flow field layer 120 on only a single side of the plate 100. Ordinarily, if a fuel cell stack is constructed in accordance with the teachings herein, a flow field layer 120 is disposed on each face of bipolar plate 100. The bipolar plates 150 constructed in accordance with this particular example can also be thought of as one-sided plates that would be located at opposing ends of a stack with two-sided bipolar plates 100 located between them. FIG. 19 illustrates an exemplary top side view of an exemplary assembly 150 illustrating flow field layer 120. Thus, it will be appreciated that an exemplary embodiment associated with the present disclosure disclosed herein is ideally suited for constructing low cost fuel cell stacks.

1-A. Fabrication of a Core Assembly

In an exemplary embodiment, the fabrication of core assembly 110 begins by cutting two 0.014 in thick Toray™ sheets 111 as shown in FIG. 2 and two 0.01 in thick FEP picture-frames 112 as shown in FIG. 3. Exemplary dimensions of the Toray™ sheets 111 are depicted in FIG. 2. The FEP picture frames 112 have outside dimensions identical to the Toray™ sheets 111, however, as seen in FIG. 3, a window 112a is cut in each FEP sheet to form a FEP picture-frame 112. This window 112a is the region of the fuel cell active area. Each FEP picture-frame 112 is then placed on the top of each Toray™ sheet 111. Next, each of the two Toray™-FEP stacks are separately heated at 540° F. for 30 minutes followed by applying a 2000 lb load resulting in approximately 200 psi pressure for about one hour. The hot press treatment under pressure allows the FEP to flow into the Toray™ sheet, resulting in sealing the pores of the Toray™ material around the perimeters of sheet 111 to form composite structures 113. The portion of the structure 113 permeated with adhesive from FEP picture frame 112 is coextensive with the original extent of the picture frame 112. Thus, as depicted in FIG. 4, composite structure 113 includes a carbon sheet having an FEP impregnated perimeter defining a carbon porous region 113a.

Next, two sheets 114 of 0.03 in thick Grafoil and four sheets 115 of 0.001 in thick FEP are cut to the same size as the edge filled Toray™ composite structures 113 previously prepared (FIG. 2-4). Two separate stacks each composed of one FEP-edge-filled Toray™ composite structure 113, one 0.001 in thick FEP sheet 115, one sheet of 0.03 in thick Grafoil 114, one 0.001 thick sheet of FEP 115, and one FEP-edge-filled Toray™ composite structure 113 are prepared, as shown in FIG. 5. As a method to measure voltage in an operating fuel cell, small electrical tabs can be inserted between the Graphoil and the 0.001 in FEP sheet 115. If not at this point, then these tabs could be inserted into the Graphoil layer just prior to operating the fuel cell. These stacks are each separately subjected to the hot-press treatment to make two core assemblies 110.

1-B. Fabrication of an Exemplary Interdigitated Flow Field Insert Layer

In an exemplary embodiment, to fabricate an exemplary interdigitated flow field insert layer 120, a 0.014 in thick Toray™ sheet 121 is cut to a size identical to what is shown in FIG. 2. Next, a FEP picture-frame 122 is cut to size as shown in FIG. 6. The FEP picture-frame 122 and the Toray™ sheet 121 are then stacked together, and then subjected to the hot-press treatment to make a FEP-edge-filled Toray™ sheet with an unsealed active area window similar to, but larger than, composite structure 113. Next, an automated XY cutting machine (not shown) is used to cut the interdigitated flow channels 131 in inlet and exit manifolds 132, 133 in the unsealed window portion of the FEP-edge-filled Toray™ sheet, resulting in the formation of flow field layer 120. The XY cutting machine is a small computer controlled X/Y table having a manually adjustable Z axis (with a gantry frame). A Velmex® Positioning System can be utilized to allow the cutting of most of the details for the bipolar plate. FIG. 7 depicts a schematic of the prepared interdigitated flow field layer 120 disclosing the dimensions of the flow channels 131 in inlet manifold 132 and exit manifold 133. FIG. 8 illustrates an exemplary completed flow field layer 120.

1-C. Assembly of an Exemplary Single Cell Bipolar Plate

In an exemplary embodiment, the single cell bipolar plate 150 is assembled by stacking the core assembly 110 described in Section 1-A, a 0.001 in thick FEP picture frame 112 depicted in FIGS. 1 and 7, and interdigitated flow field insert layer 120. In addition, to collect current a stainless steel plate 153 depicted in FIG. 13 is added to the back side of the single cell bipolar plate, as shown in FIG. 18. Stainless steel plate 153 has a portion that is positioned directly in line with the flow field, and a portion that extends out of the cell, to which load cables can be attached. To provide structural support, a Graphoil frame 152 is created out of 0.03 in Graphoil. Graphoil frame 152 has a section cut out that allows the stainless steel plate 153 to sit flush with the frame 152. A piece of 0.001 in FEP 151 is cut to dimensions of FIG. 3 and placed between frame 152 and core assembly 110. To provide additional structural support, a piece of 0.01 in Graphoil 154 cut to dimensions shown in FIG. 2 and a piece of 0.001 in FEP 115 is placed below frame 152. The stack is then subjected to the hot-press treatment. FIG. 18 shows a schematic of the prepared bipolar plate stack 150.

To make one single fuel cell assembly, two identical bipolar plates 150 can be made using the described procedure—one for an anode side of the cell and one for a cathode side of the cell. The fabricated bipolar plates 150 are then placed in the XY cutting machine to cut the reactant manifolds inlet 134, outlet 135, and hydrogen flow channel 136 feeding the flow channels 131 of the interdigitated flow field 130 of insert layer 120, and bolt holes 160. The locations and dimensions of the manifold, channels, and the bolt holes are depicted in FIG. 11. FIG. 19 is a schematic illustrating an exemplary completed single cell bipolar plate 150.

Next, the inactive area of the bipolar plates 150, which is the area around the active flow field area permeated with FEP, is coated with a 0.002 in thick Fluorolast film. The Fluorolast is applied by paint brushing followed by heat treatment of the bipolar plate at about 200° C. for two hours. The Fluorolast film is applied to act as a sealing gasket when bipolar plate is assembled using bolts.

2. Description of an Exemplary Fuel Cell Fabrication and Assembly Procedure

Figure 15:
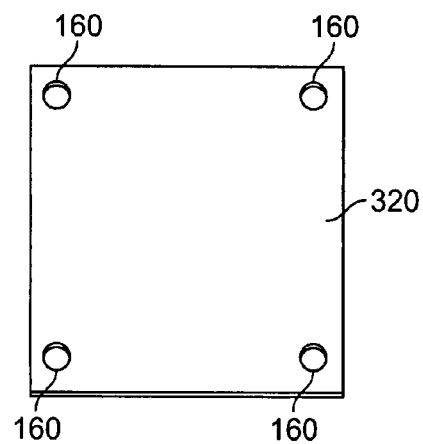

In an exemplary embodiment, a single cell fuel cell assembly 1000 (FIG. 20) is composed of two bipolar plates 150, a cathode side stainless steel endplate 310 (FIG. 14) and an anode side stainless steel endplate 320 (FIG. 15), an MEA 200 and two MEA picture frames 140. The fabrication of the MEA picture frames 140 is described in the following section.

2-A. Fabrication of Membrane-Electrode-Assembly (MEA) Picture Frames

Figure 17:
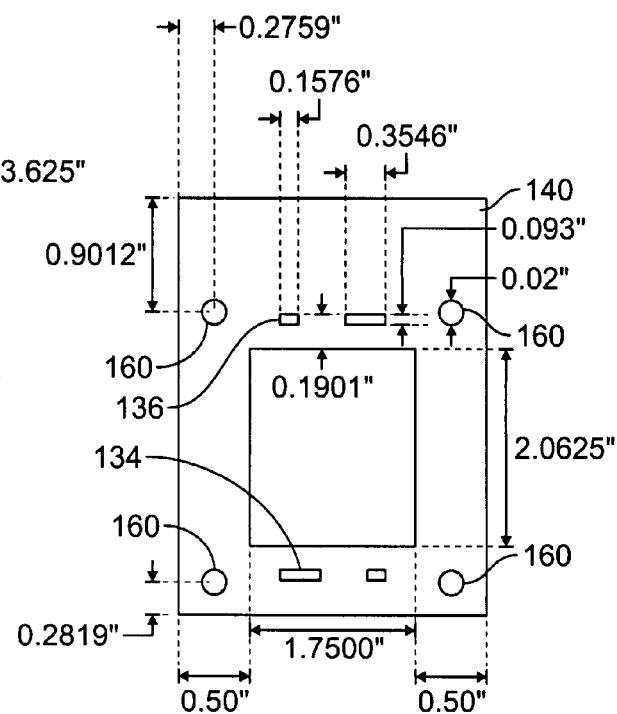

In an exemplary embodiment, two FEP-edge-filled Toray™ sheets with unsealed window portions can be fabricated in a manner similar to structures 113. Next, windows 140a are cut in each of the FEP-edge-filled Toray™ sheets to form picture frame portions 140. The dimensions of each window 140a are depicted in FIG. 16. Using the XY cutting machine, bolt holes 160 and manifolds 134 are then cut in each FEP-filled Toray™ picture-frame 140 according to design specifications. Exemplary locations and dimensions of the holes 160 and manifold inlets 134, outlets 135 and hydrogen flow channels 136 are depicted in FIG. 17.

Next, a 0.002 in thick Fluorolast coat is applied onto each surface of each picture frame 140. This was accomplished by brush painting Fluorolast onto each picture frame 140, which are then heat-treated in an oven at 200° C. for two hours. With reference to FIG. 38, a membrane electrode assembly ("MEA") 200 including a catalyst-coated membrane 201 with gas-distribution layers 202 on each side and a thin polymeric picture frame 203 is then selected. In an exemplary embodiment, an MEA has an active area of 18 $cm^2$.

2-B. Assembly of the Fuel Cell

Figure 20:
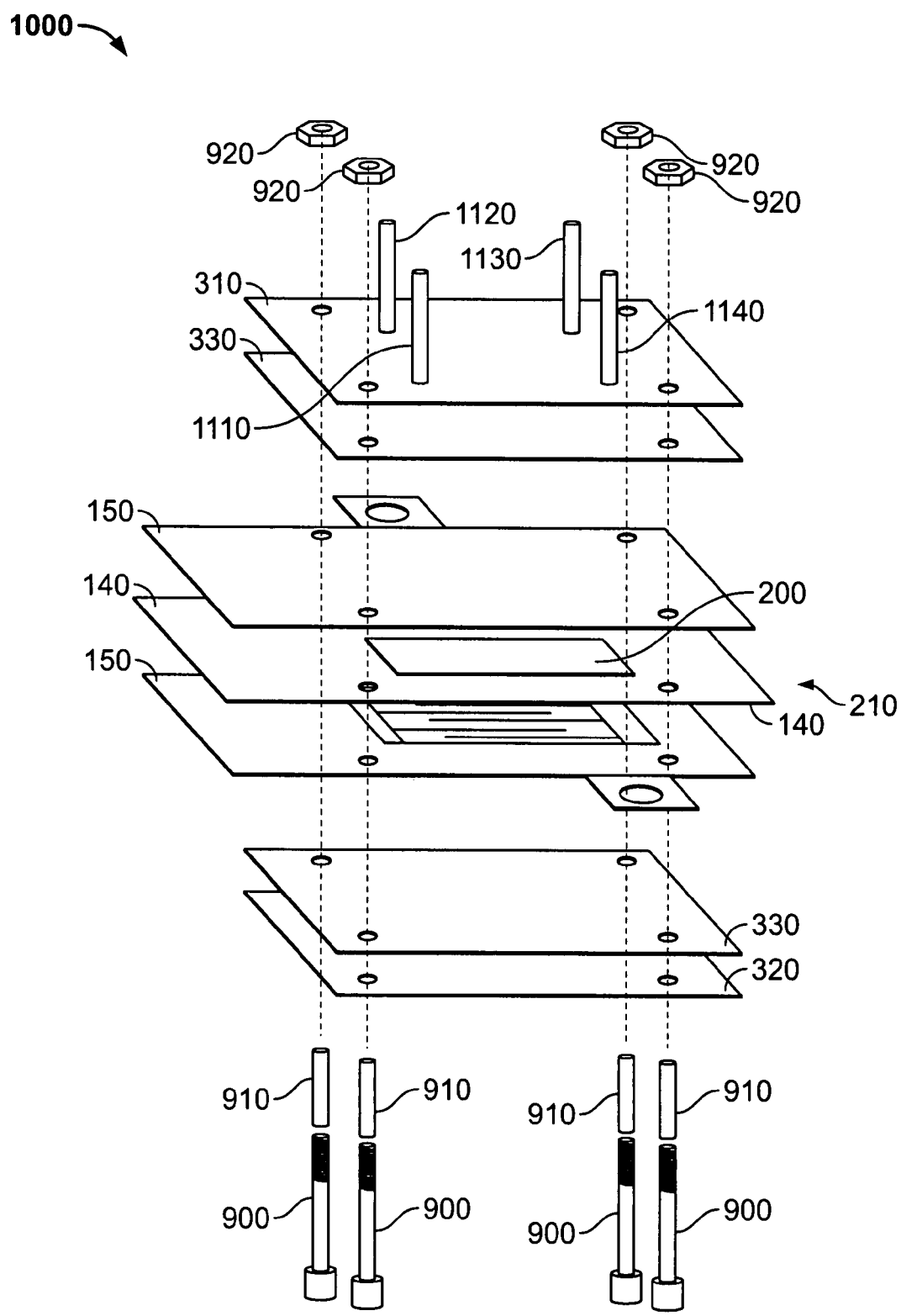
FIG. 20 depicts an exploded view of an exemplary single cell fuel cell made in accordance with the present disclosure.
Figure 30:
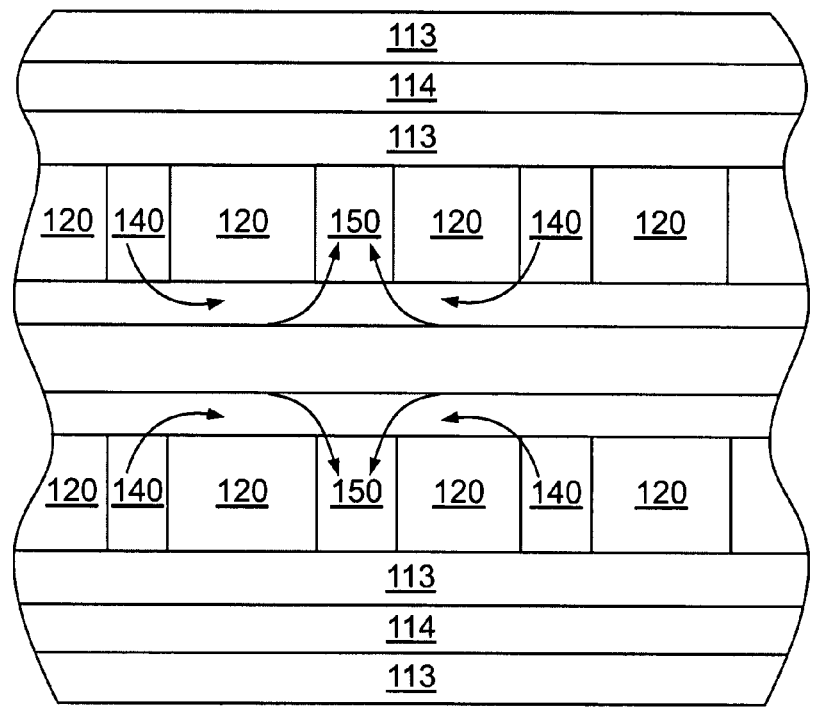
FIG. 30 is a cross section view of an exemplary fuel cell made in accordance with the present disclosure illustrating flow induced by an interdigitated flow field provided by the present disclosure.

In an exemplary embodiment, assembly of fuel cell 1000 involves placing the MEA 200 between two picture frames 140, which in turn are sandwiched between the anode and cathode bipolar plates 150, which in turn are sandwiched between two stainless steel endplates 310 and 320, as depicted in FIG. 20. Two pieces of Viton® are placed between the stainless steel endplates and bipolar plates 150 to provide a gas-tight seal. Corresponding holes for the gas ports 134, 135 and 136 and bolt holes 160 are cut out of the Cathode-side Viton, while only bolt holes 160 are cut out on the Anode-side Viton. Four bolts 900 are used to provide load compression needed for the fuel cell 1000 (FIG. 20). Each bolt 900 is surrounded by an electrically insulating bushing 910 and fastened in place with a nut 920. A 25 in-lb force is applied in each bolt 900. As depicted in FIG. 20, fuel cell includes a cathode inlet 1110, an anode inlet 1120, a cathode outlet 1130 and an anode outlet 1140. Fluorolast film deposited on the outer surfaces of the MEA picture frames and on the exposed perimeters of each bipolar plate 150 act to form a fluid tight seal to permit cell operation. In addition, the MEA picture frames 140 are designed so that the gas diffusion layers 202 of the MEA 200 (generally a woven carbon cloth) protrudes out beyond the surface of picture frames 140. This causes the gas distribution layer to be compressed by each flow field layer when the cell 1000 is assembled, as illustrated schematically with respect to FIG. 30. In an exemplary stack, the bipolar plates 100 and associated manifolding are arranged so that the flow through adjacent cells in a fuel cell stack occurs in parallel as depicted in FIG. 32.

3. Performance Comparison with Gold-Plated Serpentine Flow Field Design

3-A. Current-Voltage Characteristics

Figure 21:
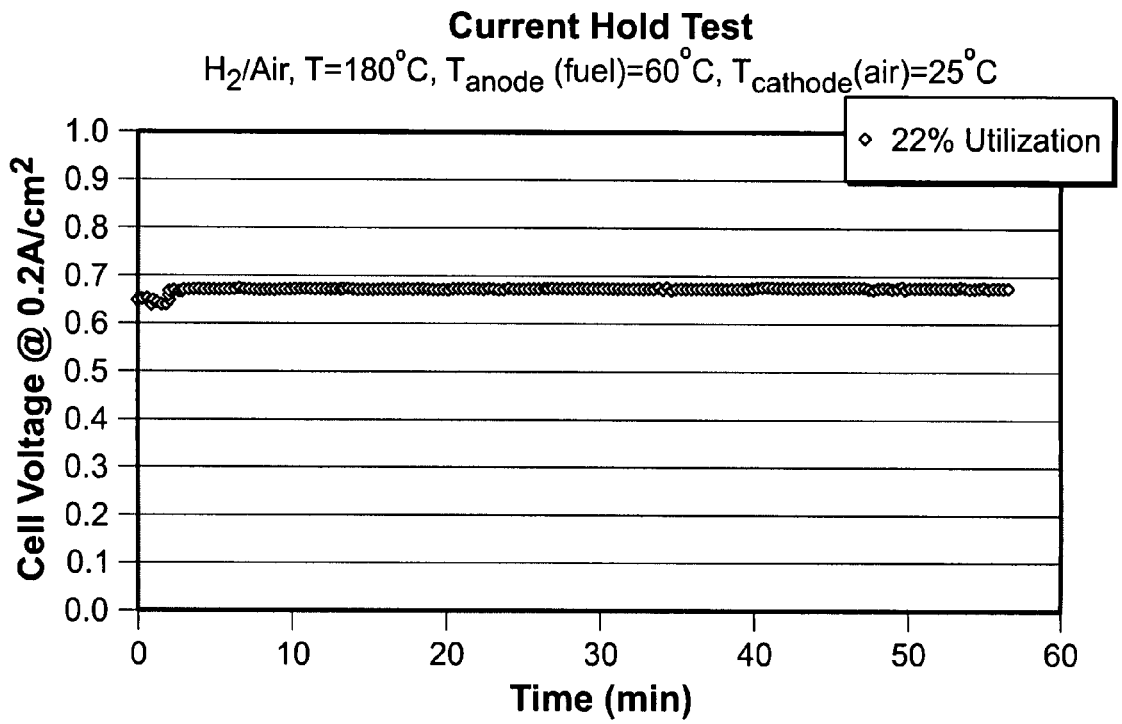
FIGS. 21-24 graphically depict data demonstrating performance of a fuel cell made in accordance with the present disclosure.
Figure 22:
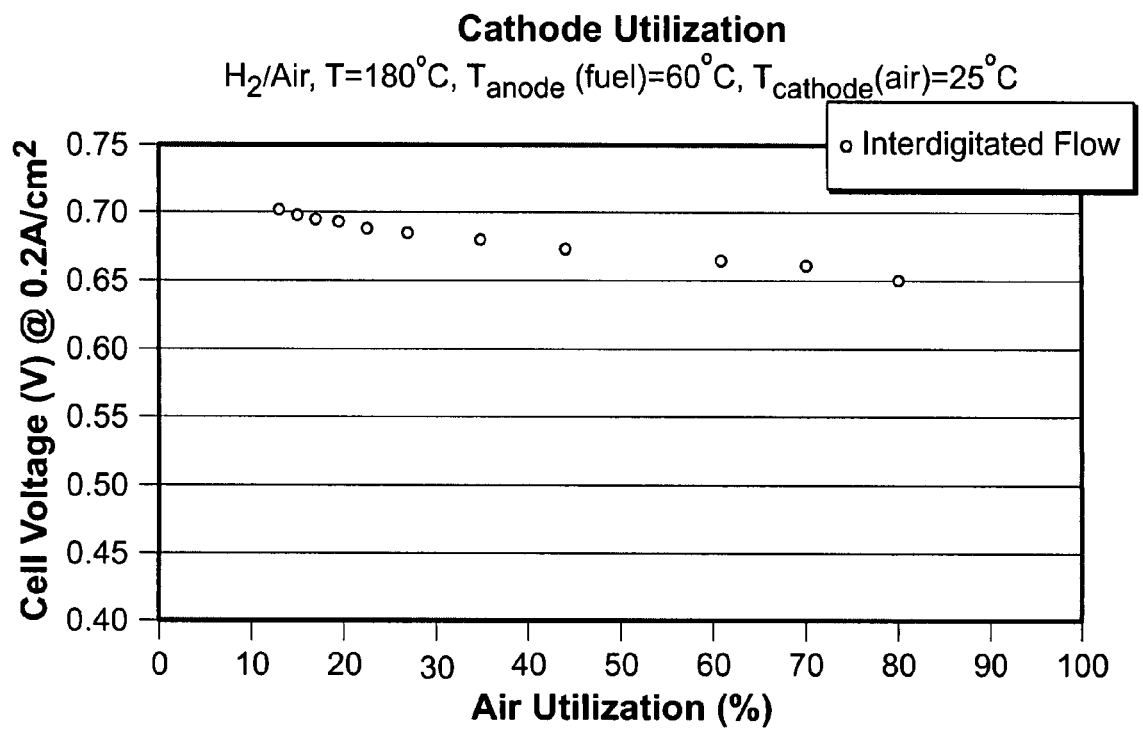
Figure 23:
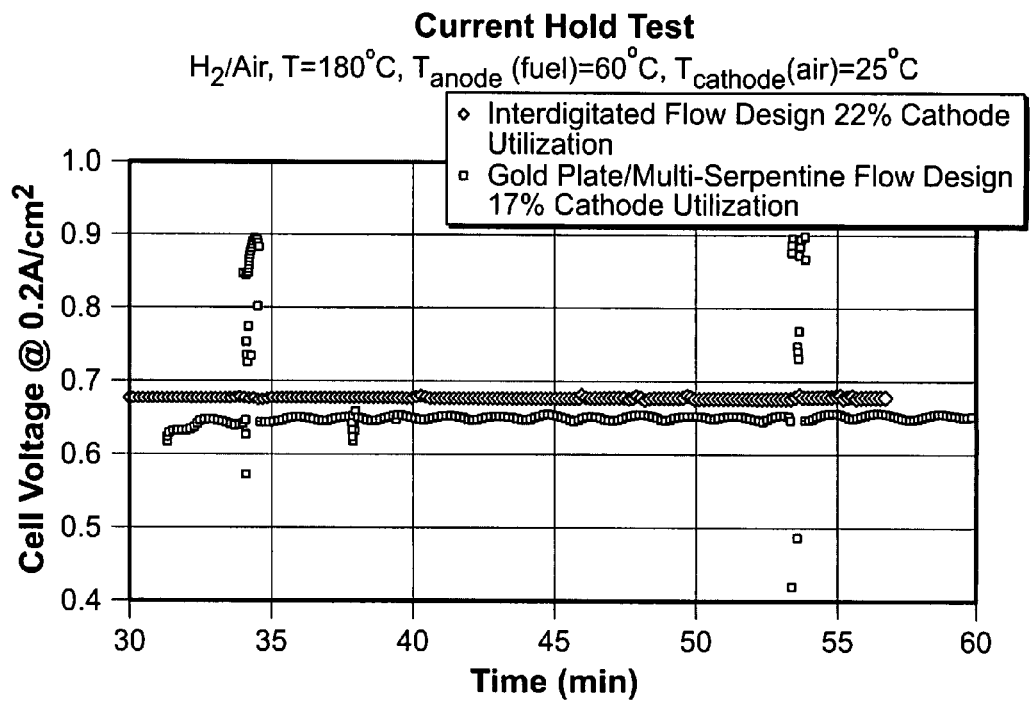
Figure 24:
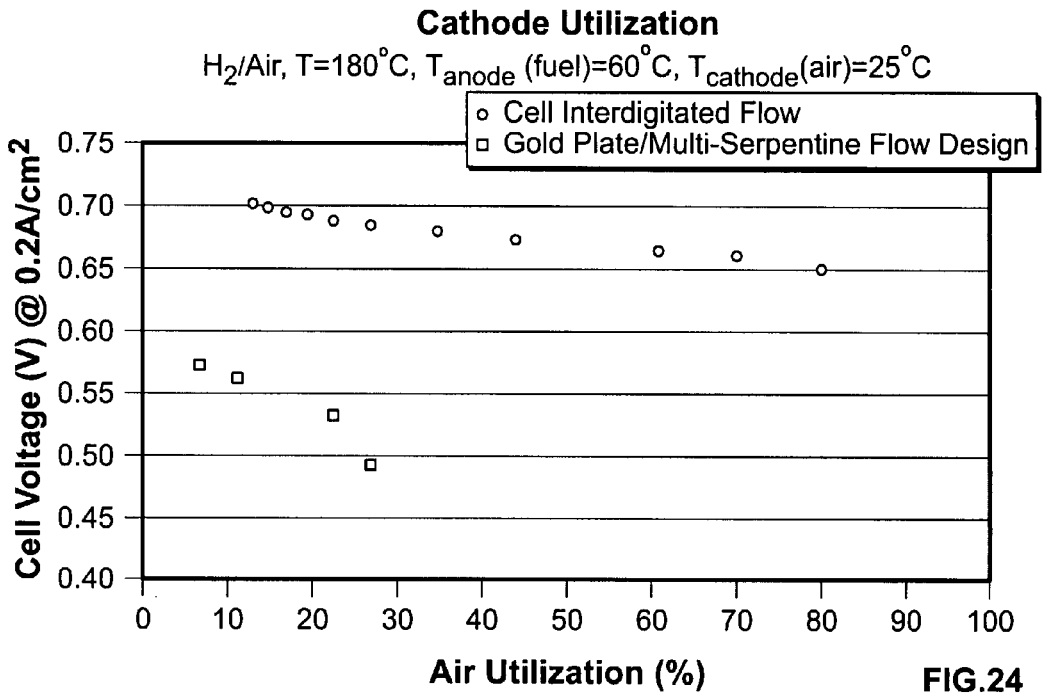
Figure 34:
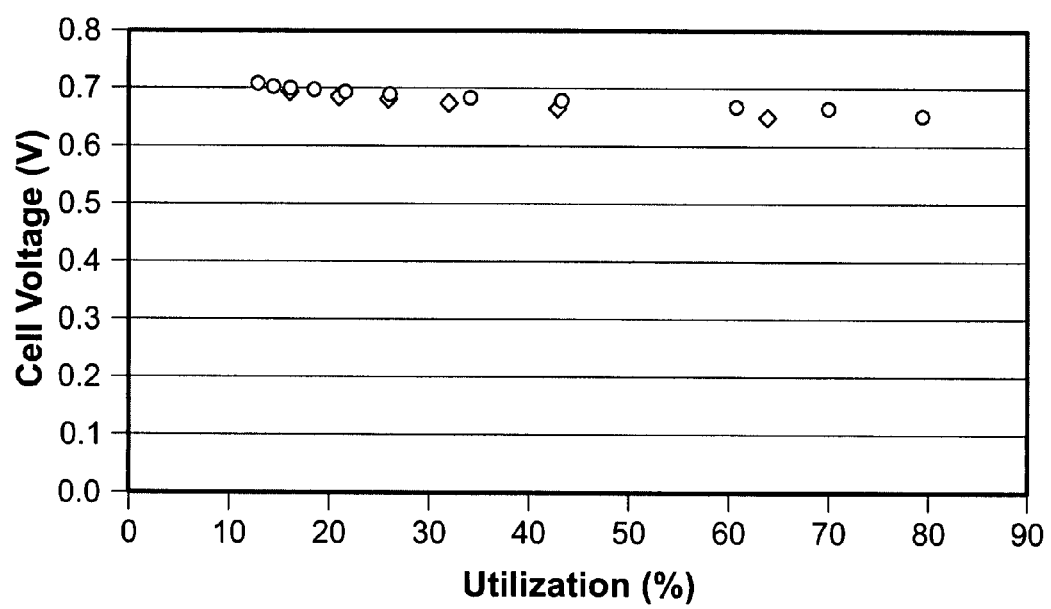
FIG. 34 illustrates a utilization scan for two exemplary single cells (Cells #9 and #19 under operating conditions: $T_{cell}$=180° C., Inlet Dew Point Temperature of the Anode Side Reactants ($T_{anodeDP}$)=60° C., Inlet Dew Point Temperature of the Cathode Side Reactants ($T_{cathodeDP}$)=25° C., I=200 mA/cm$^2$.

In an exemplary embodiment, a fuel cell 1000 was built using the example described hereinabove. The performance of the cell was measured under hydrogen/air operation and ambient pressure conditions. The performance evaluation included current-voltage characteristics at a cell temperature of 180° C., and cyclic voltammetry and hydrogen crossover measurements at room temperature. In all tests at 180° C., the anode saturator temperature (anode inlet reactants dew point temperature ($T_{anodeDP}$)) was set to 60° C., while the cathode saturator (cathode inlet reactants dew point temperature ($T_{cathodeDP}$)) was held at room temperature, with the temperature of the anode and the cathode feeding tubes set to 80° C. After the startup and conditioning, the cell was held at constant current density of 200 $mA/cm^2$ at a cathode utilization of 22% while monitoring the cell voltage with time. The resulting cell performance was about 0.675V at 200 $mA/cm^2$. FIG. 21 depicts the current hold test data for fuel cell 1000. Fuel cell 1000 was then subjected to a cathode utilization test. The results from this test are presented in FIG. 22. Fuel cell 1000 appeared to be insensitive to air flow, which yielded a minimal cell voltage loss even at airflow rates at 80% utilization. This indicates that the bipolar plates associated with the present disclosure provides good distribution of reactants with a reasonable pressure drop. As depicted in FIGS. 23 and 24, bipolar plate 150 offers good performance and also better distribution of reactants when compared with a gold plated prior art bipolar plate having a multi-serpentine flow field design. A second fuel cell was constructed in accordance with the teachings of Example 1 hereinabove and resulted in performance similar to the first fuel cell 1000 that was constructed (See e.g., FIG. 34).

4. Heat Transfer Analysis

Figure 25:
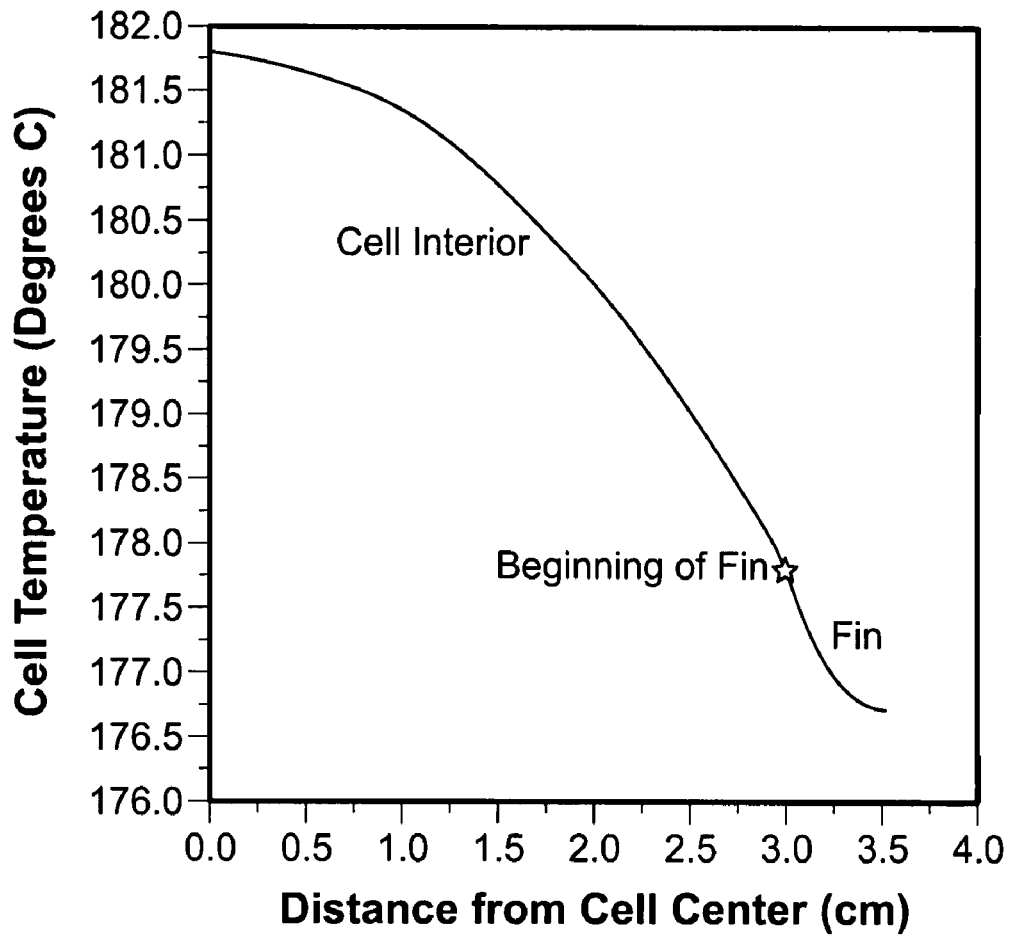
FIG. 25 depicts the temperature profile across a bipolar plate made in accordance with the present disclosure.

Measured values of in-plane conductivity of bipolar plates 100 were obtained from the Thermophysical Properties Research Laboratory, Inc. This data was used to calculate the in-plane temperature profile for bipolar plate 100. Assumptions were made of the cell dimensions and operating conditions. The difference in temperature from the center of the cell to the edge was found to be only about 4° C., a satisfactory value. The complete temperature profile is shown in FIG. 25.

5. Evaluation of Reactant Flow Characteristics of Carbon Bipolar Plates

5-A. Experimental Measurements of Total Pressure Loss

Figures 2, 26:
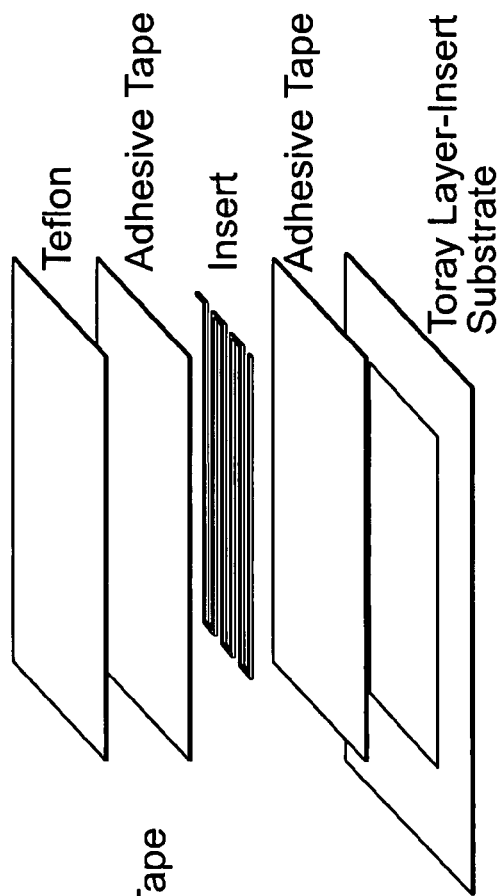
FIGS. 26-29 depict aspects of flow testing bipolar plates made in accordance with the present disclosure.
Figures 1, 26:
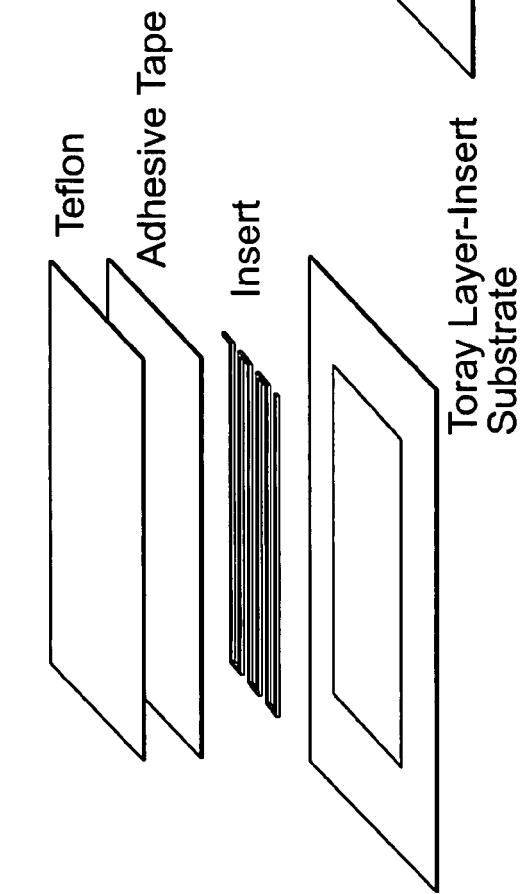

To evaluate flow characteristics of carbon bipolar plates 100 made in accordance with the present disclosure, experiments were conducted to evaluate the pressure drop through a carbon bipolar plate as disclosed herein with an interdigitated flow field design as described in Example 1, hereinabove. To determine the relative amount of reactant leakage between two adjacent flow channels and through the insert substrate, a fuel cell 1000 was assembled using various configurations. FIGS. 26-1 and 26-2 depicts schematics of the cell configurations employed in pressure drop experiments. The assembly associated with FIG. 26-1 includes a single adhesive tape layer while the assembly associated with FIG. 26-2 includes a pair of adhesive tape layers, one on each side of the insert. Pressure drop was measured between the inlet and exit tubes of the cell using varying nitrogen flow rates. The experimental flow setup was essentially the same as that depicted in FIG. 27.

Figure 27:
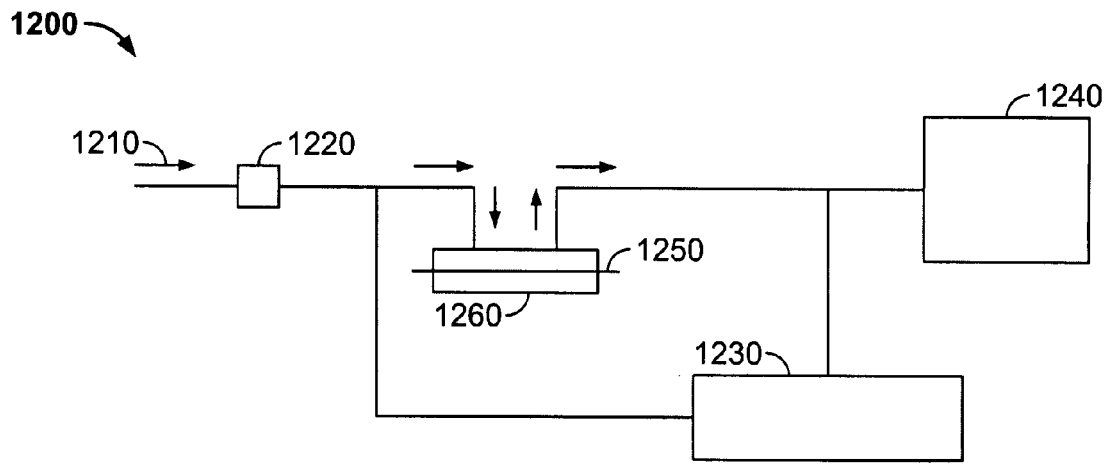

As depicted in FIG. 27, flow test setup 1200 includes a nitrogen supply 1210, a needle valve 1220, manometers 1230 (including both a slant-tube-style manometer and a slack-tube-style manometer), a digital flowmeter 1240 (Fisher Scientific, Model 750), flow channels 1260 with insert 1250, Teflon, double sided tape, a membrane electrode assembly "MEA" (washed and then dried) and stainless steel plates 1270 (not shown) for assembling the flow field 1260 with insert or MEA 1250, as described below.

Needle valve 1220 was adjusted until a desired flow-rate was reached (as read from the digital flowmeter 1240) and the pressure drop across the flow channels 1260 is measured with the manometers 1230. After the pressure drop is recorded, the needle valve 1220 is changed until a new flow-rate is achieved.

The pressure was measured as a function of flow rate using nitrogen. The inlet and outlet streams were then reversed, and data were collected as before.

Figure 28:
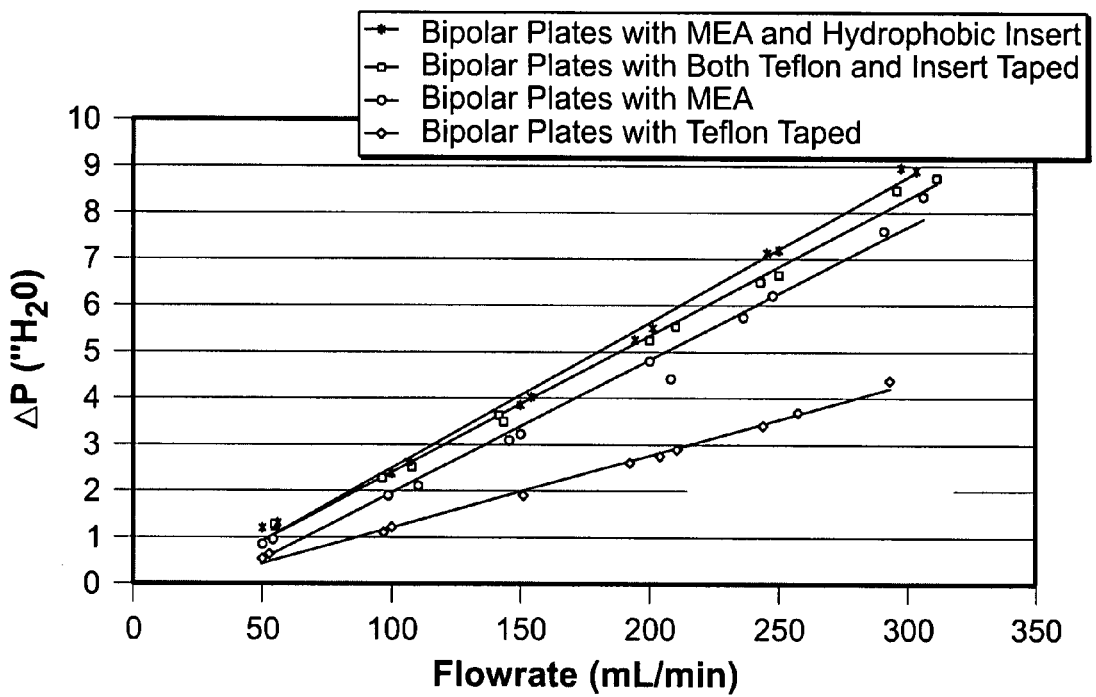

Experiments were conducted as follows:
1) Teflon was taped directly to the Toray™ flow channel insert using the double-sided tape (FIG. 26-1);
2) Teflon was taped to the Toray™ flow channel insert, and the insert was taped to the bipolar plate assembly (FIG. 26-2);
3) An MEA that was washed and dried was placed over the flow field;
4) An MEA that was washed and dried was placed over a flow field that had been treated to be hydrophobic;

FIG. 28 shows the pressure drop measurements as a function of $N_2$ flow rate for these four experiments.

5-B. Modeling Analysis of Flow Distribution in Carbon Bipolar Plates

Figure 29:
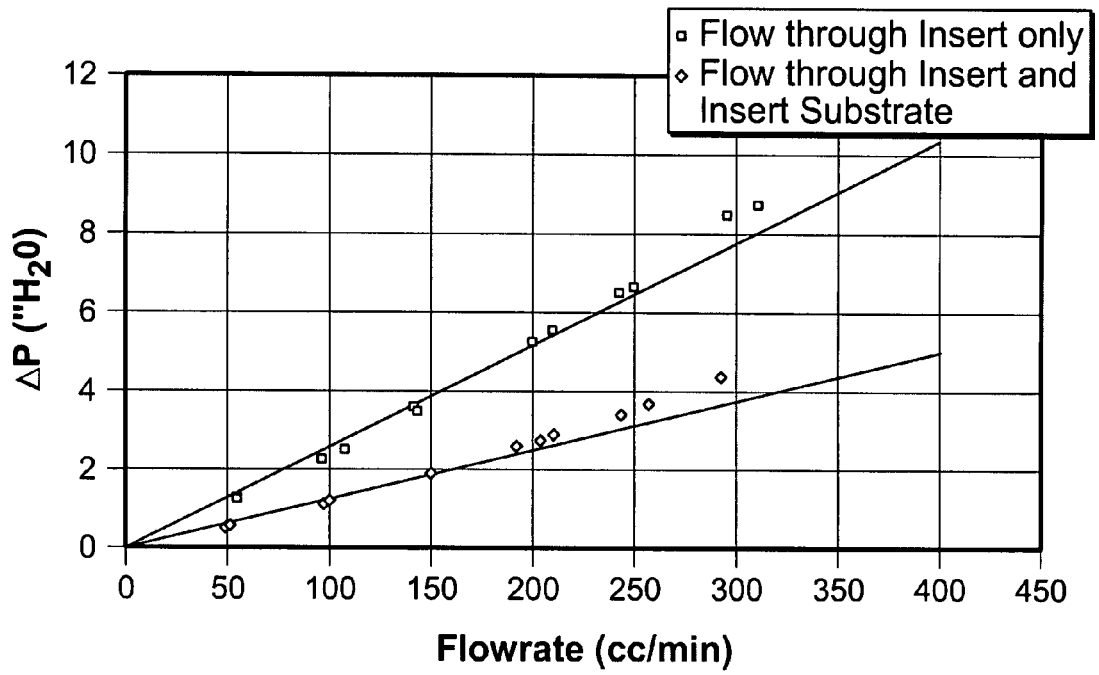

A one-dimensional model has been developed to estimate the pressure drop in the interdigitated flow field design depicted herein. The model was based on having reactant flow through the three porous layers of the cell assembly, that is the insert substrate, the insert, and the gas diffusion layer. The total pressure was calculated in different locations along the gas distributors. These calculations were based on the assumption that the reactant flow is steady, non-compressible, and that the reactant flow rate is high enough that the consumption due to electrochemical reaction can be ignored. The model predicts that the majority of the resulted pressure drop occurs through the ribs separating the interdigitated flow channels. A minimal pressure loss is experienced in the inlet and exit manifold. The model also assumes an equal permeability between the three porous layers, which was set to be equal to the permeability of the Toray™ material used to make the bipolar plate assembly. To examine the model predictions against the experimental data obtained for pressure drop through the subject flow field design, a comparison between the model and the experimental data was performed. FIG. 29 shows the experimental versus theoretical pressure drop in a cell configuration that was built to only allow for gas flow through the ribs separating the interdigitated flow channels. As can be seen the model correlates well with the data.

For further examination, in addition the flow through the ribs separating the interdigitated flow channels, the model was readjusted to account for the flow through the insert substrate without changing the fitting parameter. As can be observed in FIG. 29, the model predicts well the change in the total pressure drop.

6. Assembly of an Exemplary 4-Cell Stack

Figure 36:
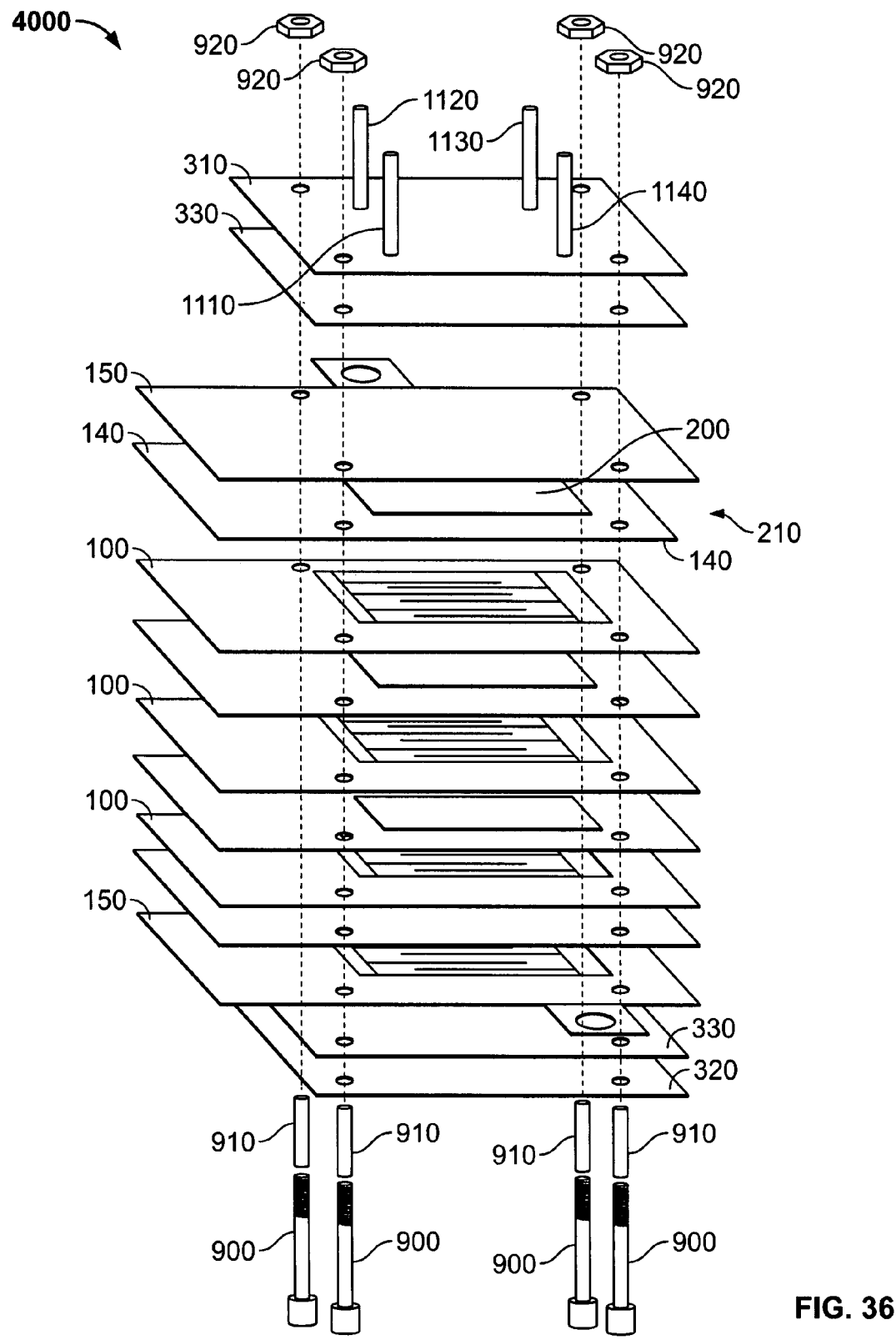
FIG. 36 depicts an exemplary assembly of a four-cell stack in accordance with the present disclosure.
Figure 37:
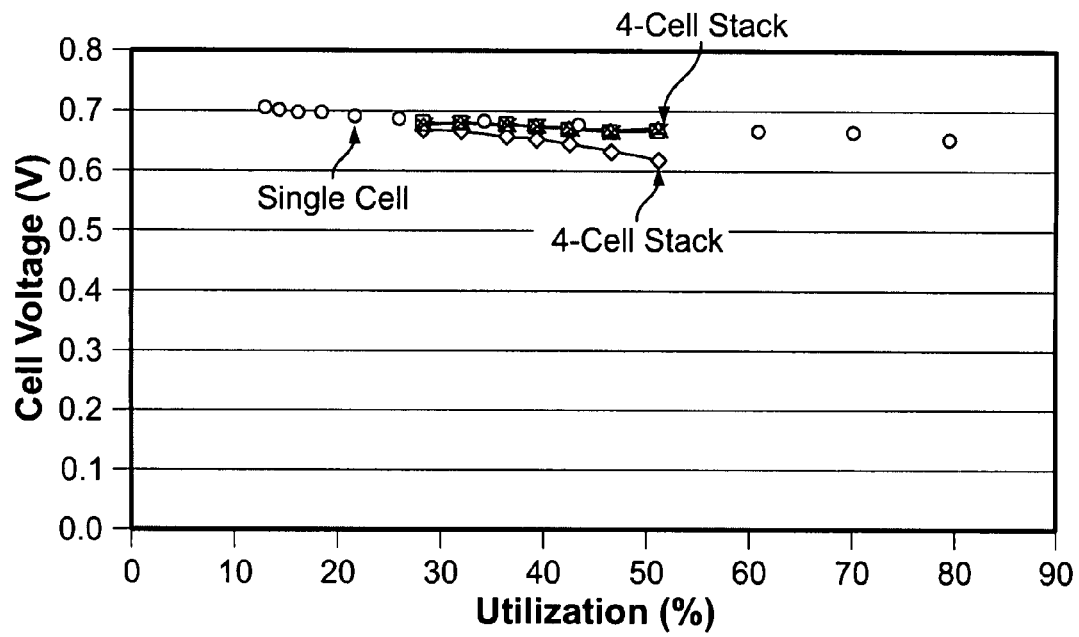
FIG. 37 graphically depicts data associated with performance of an exemplary four-cell stack.

Fuel cells often are utilized in a cooperation with a plurality of fuel cells coupled with respect to each other in a series to produce sufficient voltage for use in a variety of practical applications. The present disclosure provides for an exemplary design employed in manufacturing of a 4-cell stack 4000, as described hereafter with respect to FIG. 36. All components associated with stack 4000 have been described with respect to embodiments previously disclosed hereinabove. The assembly of the stack is shown schematically in FIG. 36. In an exemplary embodiment, two single cell bipolar plates are used at either end of the stack, with three bipolar plates in between, thus forming four cells cooperating in series. Between each plate, an MEA 200 with two picture frames 140 on either side, is added. Performance of the individual cells within the stack is nearly identical to the performance of single cells as illustrated graphically with respect to FIG. 37.

7 Impact of Adding Acid to Bipolar Plates

In order to achieve high reproducible and durable performance in cells using phosphoric acid in the membrane electrode assembly, the addition of phosphoric acid electrolyte to the porous insert between the interdigitated flow field of the solid core of the bipolar plate was found necessary. The porous nature of the bipolar plate design allows it to serve as an electrolyte reservoir. To this end, phosphoric acid was added to both the anode and cathode sides of the plates during assembly. It was discovered that adding acid to the plates improved initial performance by 30 mV for single cells, and about 140 mV for a four-cell stack. Six single-cells and two 4-cell stacks were examined for performance changes. All cells and stacks had both anode and cathode plates painted with a carbon/methanol slurry, which was then dried at 70° C. for 1 hr. For those cells and stacks with acid added, about 0.6 g of acid was added to both the cathode and anode plates; and in the case of the stack, both sides of the bipolar plates had acid added. After adding acid, the plates were heated at 70° C. for one more hour, and any excess acid was blotted off. The cells and stack were then assembled.

Figure 33:
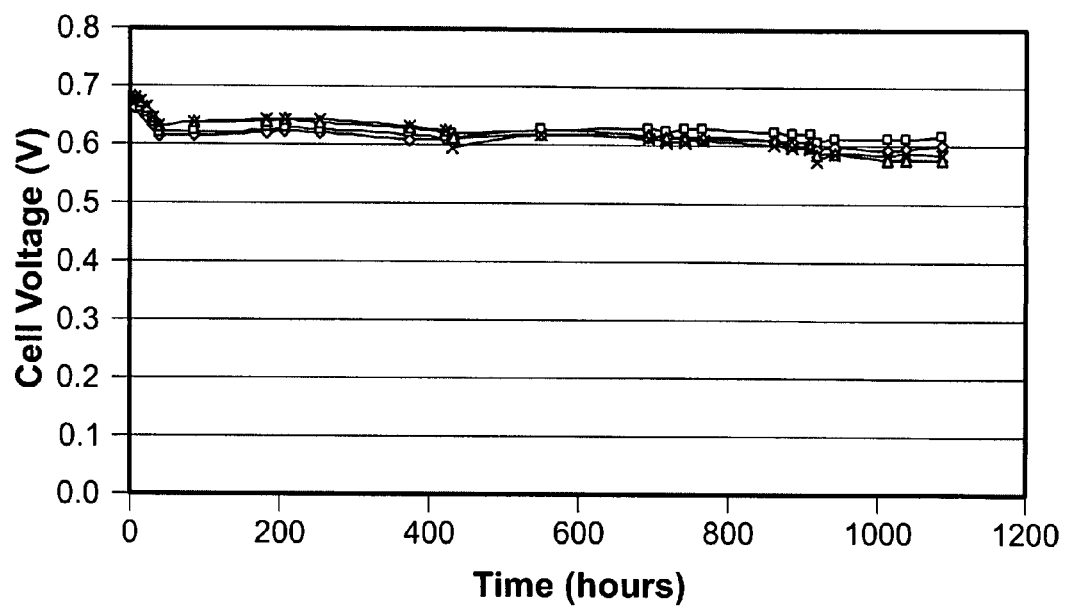
FIG. 33 illustrates endurance data associated with an exemplary fuel cell stack in accordance with the present disclosure under steady state voltage of cells in stack #4 and operating conditions: $H_2$/Air (30% U), 180° C., 200 mA/cm$^2$.

FIG. 35 shows the impact of acid addition. For the single cells, adding acid improved performance by about 30 mV for the conditions shown, while the stack improved by about 140 mV. We suspect that by adding acid to the plates, less acid is drawn out of the MEA once the cell is assembled. Using this design, a 4-cell stack was operated continuously for over 1000 hours with stable performance (FIG. 33).

8. Exemplary Materials Effective to Further Reduce Cost

Exemplary embodiments of bipolar plate 100 disclosed herein provide for a multilayer design made from carbon materials such as Toray™ paper and Grafoil®. As mentioned hereinabove, the various layers of plate 100 can be stacked together using fluoroplastic films such as PFA and FEP as bonding and filling agents. Advantageously, fluoroplastics have excellent thermal, chemical, and mechanical properties for use in high temperature phosphoric acid fuel cells.

It will be appreciated that the cost of bipolar plate 100 is lower compared to, for example, gold plated aluminum plates of the prior art because of the low cost carbon components and fluoroplastics. While Toray paper and FEP films are disclosed and used in accordance with the examples herein, various methods for cost reduction are further possible.

For example, the FEP films and Toray™ paper can be replaced with low cost alternative materials. Specifically, low cost Fluorolast paste can be used to bond and seal the carbon paper instead of FEP films. Moreover, Toray™ paper can be replaced with low cost Spectracarb series of paper from Spectracorp (Lawrence, Mass.). These modifications can be made to plate 100 without significantly, if at all, changing the design described herein.

By way of further example, in an exemplary embodiment, the design of plate 100 can be modified somewhat to permit usage of additional alternative materials. As discussed herein, the use of porous carbon paper such as Toray is advantageous in the flow field layers 120 because of its porous nature (to assist in acid management) and acid resistance. The use of Grafoil® is similarly advantageous for its high in-plane thermal conductivity, which can offset the lower conductivity of other portions of plate 100 to assist in heat removal. As will be recalled from the discussion above, various embodiments disclosed herein use Toray™ paper across the full extent of plate 100 (for example, in forming composite structures 113 and layers 120). As also discussed above, to prevent the reactant gas from leaking out of the active area of the cell, the porous carbon paper is filled with either Fluorolast™ or FEP.

In accordance with a further exemplary embodiment, it is possible to use porous carbon paper only in the active area of the plate (that is, the area in contact with the MEA 200). As such, the frame covering the active area can be made using a low cost molded plastic part instead of relatively expensive fluoropolymer filled carbon paper. Specifically, polymer composites, which can withstand the high operating temperatures and are inexpensive, can be used. Different options available include, for example, high temperature carbon/graphite filled Polyimide, Polyphenylenesulfide, Polysulfone, epoxy, Polyetheretherketone, and the like.

The systems and methods associated with the present disclosure, as described hereinabove and shown in the drawings, provide for exemplary bipolar plates yielding superior properties, including reduced cost and greater ease of mass production. It will be apparent to those skilled in the art that various modifications and variations can be made to the assemblies and methods associated with the present disclosure without departing from the spirit or scope of thereof. Thus, it is intended that the present disclosure include modifications and variations that are within the scope of the appended claims and their equivalents.

What is claimed:

1. A bipolar plate assembly for use in a fuel cell stack, comprising:
   (a) at least one flow field layer defining a flow field portion and a perimeter portion;
   (b) at least one core assembly including at least one porous carbon layer and at least one impermeable layer; and
   (c) a cathode side reactant and an anode side reactant;
   wherein the at least one flow field layer is made from a porous carbon material and the perimeter portion is impregnated with a polymer material;
   wherein the at least one porous carbon layer is joined to: (i) the at least one impermeable layer on a first side by a first adhesive material; and (ii) the flow field layer perimeter on a second side by a second adhesive material; and
   wherein the at least one flow field layer defines reactant inlet and outlet ports and reactant flow passageways for each of the cathode side reactant and the anode side reactant.

2. The assembly of claim 1, wherein the cathode side reactant is air and the anode side reactant is fuel.

3. The assembly of claim 2, wherein the fuel is selected from the group consisting of hydrogen and a hydrogen carrying gas.

4. The assembly of claim 1, wherein the impermeable layer is made from carbon and exhibits electrical and heat conductive properties.

5. The assembly of claim 1, further comprising a second flow field layer disposed on an opposite side of the core assembly with respect to the at least one flow field layer.

6. The assembly of claim 1, wherein the second adhesive material is a fluorocarbon, and the second adhesive material infiltrates pores defined in the porous carbon material associated with the flow field layer and the porous carbon layer.

7. The assembly according to claim 1, wherein the porous carbon layer associated with the core assembly is impregnated with a polymer material defining a porous portion adapted to allow for fluid interaction through both the flow field portion of the flow field layer and the porous portion of the porous carbon layer.

8. The assembly according to claim 7, wherein the first and second adhesive materials are layers defining openings adapted to allow for fluid interaction between the porous portion of the porous carbon layer and the flow field portion of the flow field layer.

9. The assembly of claim 8, wherein at least one of the first and second adhesive materials is selected from the group consisting of Polytetrafluoroethylene (PTFE), Perfluoroalkoxy (PFA) and Fluorinated Ethylene Propylene (FEP).

10. The assembly of claim 1, wherein the reactant flow passageways defines a plurality of parallel flow passageways to allow reactants to pass through the parallel flow passageways.

11. The assembly of claim 1, wherein the reactant flow passageways define a substantially serpentine geometry to allow reactants to pass through the flow passageways.

12. The assembly of claim 1, wherein the bipolar plate is defined by a generally rectangular perimeter.

13. The assembly of claim 12, wherein the impermeable layer includes at least one cooling fin extending beyond the generally rectangular perimeter.

14. The assembly of claim 13, wherein the cooling fin is integrally formed with respect to the impermeable layer.

15. The assembly of claim 1, wherein the flow field layer, the porous carbon layer and the impermeable layer define through plane electrical conductivity, and the through plane electrical conductivity is not substantially compromised by the first and second adhesive materials.

16. The assembly of claim 1, wherein the at least one flow field layer is made from a porous carbon material selected from the group consisting of sealed carbon paper, carbon/polymer composites, and carbon mat.

17. The assembly of claim 1, wherein the at least one porous carbon layer is made from a porous carbon material selected from the group consisting of sealed carbon paper, carbon/polymer composites, and carbon mat.

18. A fuel cell stack assembly comprising:
(a) a plurality of bipolar plates, at least one of the bipolar plates including a plurality of adjacent layers of material joined by an adhesive material, wherein at least one of the layers is composed of carbon material; and
(b) at least one membrane-electrode assembly disposed between two of the bipolar plates
wherein each of the bipolar plates includes:
 (i) at least one flow field layer defining a flow field portion and a perimeter portion;
 (ii) at least one core assembly including at least one porous carbon layer and at least one impermeable layer;
 (iii) a cathode plate and an anode plate; and
 (iv) a cathode side reactant and an anode side reactant;
wherein the at least one flow field layer is made from a porous carbon material and the perimeter portion is impregnated with a polymer material;
wherein the porous carbon layer is joined to: (i) the at least one impermeable layer on a first side by an adhesive material; and (ii) the flow field layer perimeter on a second side by a second adhesive material;
wherein the plurality of bipolar plates are disposed between the cathode and the anode plates; and
wherein the at least one flow field layer defines reactant inlet and outlet ports and reactant flow passageways for each of the cathode side reactant and the anode side reactant.

19. The assembly of claim 18, wherein the cathode side reactant is air and the anode side reactant is fuel.

20. The assembly of claim 19, wherein the fuel is a gas selected from the group consisting of hydrogen and a hydrogen carrying gas.

21. The bipolar plate assembly of claim 1, wherein the porous carbon layer is treated to increase wettability of the porous carbon layer.

22. The bipolar plate assembly of claim 1, wherein the porous carbon material defines a plurality of pores and the porous carbon material is treated to increase wettability by coating the pores of the porous carbon material with a wettable material.

23. The bipolar plate assembly of claim 22, wherein the wettable material is carbon black.

24. The bipolar plate assembly of claim 1, wherein the impermeable layer is treated such that the impermeable layer is rendered substantially impervious to infiltration by an acidic liquid.

25. The bipolar plate assembly of claim 1, further comprising the steps of adding liquid phosphoric acid electrolyte to the bipolar plate to provide a reservoir of electrolyte during cell operation following cell assembly.

* * * * *